United States Patent
Lee et al.

(10) Patent No.: US 12,060,075 B2
(45) Date of Patent: Aug. 13, 2024

(54) UPDATE OF SEAMLESS CONTAINER IN VEHICLES SYSTEM BASED ON CONTAINER

(71) Applicant: LG ELECTRONICS INC., Seoul (KR)

(72) Inventors: Chulhee Lee, Seoul (KR); Eunkoo Lee, Seoul (KR); Hyunkyu Kim, Seoul (KR); Namyong Park, Seoul (KR); Woosung Kim, Seoul (KR); Dongkyu Lee, Seoul (KR); Taesuk Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 959 days.

(21) Appl. No.: 17/075,890

(22) Filed: Oct. 21, 2020

(65) Prior Publication Data

US 2021/0146950 A1    May 20, 2021

Related U.S. Application Data

(60) Provisional application No. 62/935,654, filed on Nov. 15, 2019.

(30) Foreign Application Priority Data

Jun. 30, 2020  (WO) ................ PCT/KR2020/008539

(51) Int. Cl.
*B60W 60/00*     (2020.01)
*G06F 8/65*       (2018.01)
(Continued)

(52) U.S. Cl.
CPC ............ *B60W 60/001* (2020.02); *G06F 8/65* (2013.01); *G06F 8/71* (2013.01); *G06F 9/30098* (2013.01);
(Continued)

(58) Field of Classification Search
None
See application file for complete search history.

(56) References Cited

U.S. PATENT DOCUMENTS 10,197,999 B2 *  2/2019  Doane ............... G01C 21/20
10,331,126 B2 *  6/2019  Doane ............... A63B 55/61
(Continued)

FOREIGN PATENT DOCUMENTS

| KR | 101636594     | 7/2016 |
| KR | 1020190005152 | 1/2019 |
| KR | 1020190102843 | 9/2019 |

OTHER PUBLICATIONS

PCT International Search Report and Written Opinion in International Appln. No. PCT/KR2020/008539, dated Oct. 7, 2020, 7 pages (with English translation).
(Continued)

*Primary Examiner* — Kim T Nguyen
(74) *Attorney, Agent, or Firm* — Fish & Richardson P.C.

(57) ABSTRACT

A method for updating a container in a container-based vehicle system includes: executing an application included in the container, the application configured to access at least one item included in the container to operate a service related to a vehicle, receiving, from a server, a container image of an update target based on determining an update of the container being needed, the container image including a set of items, storing the received container image of the update target in a system registry, generating a new container by combining a user data item that is generated in the container and the stored container image of the update target, and updating the container by using a container management table on the new container while executing the application. The application reflects the updated container based on items included in the updated container.

20 Claims, 25 Drawing Sheets

(51) Int. Cl.
*G06F 8/71* (2018.01)
*G06F 9/30* (2018.01)
*G06F 16/21* (2019.01)
*G06F 16/22* (2019.01)
*G06V 20/56* (2022.01)

(52) U.S. Cl.
CPC .......... *G06F 9/3017* (2013.01); *G06F 16/219* (2019.01); *G06F 16/2282* (2019.01); *G06F 16/2291* (2019.01); *G06V 20/56* (2022.01)

(56) References Cited

U.S. PATENT DOCUMENTS

| | | | | |
|---|---|---|---|---|
| 11,262,953 | B2* | 3/2022 | Corrie | G06F 3/0683 |
| 11,459,224 | B2* | 10/2022 | Lee | B67D 1/0431 |
| 11,492,741 | B2* | 11/2022 | Choi | D06F 34/32 |
| 11,573,816 | B1* | 2/2023 | Featonby | H04L 67/10 |
| 11,634,849 | B2* | 4/2023 | Park | G06N 3/045 |
| | | | | 8/158 |
| 11,645,100 | B2* | 5/2023 | Corrie | G06F 8/61 |
| | | | | 718/1 |
| 11,677,922 | B2* | 6/2023 | Oh | H04N 13/161 |
| | | | | 348/43 |
| 11,722,553 | B2* | 8/2023 | Shiell | H04L 67/10 |
| | | | | 709/224 |
| 11,727,083 | B2* | 8/2023 | Fisher | G06F 8/41 |
| | | | | 709/223 |
| 11,730,302 | B2* | 8/2023 | Jeong | A47J 43/046 |
| | | | | 366/347 |
| 11,803,438 | B2* | 10/2023 | Muralidharan | G06F 11/0769 |
| 11,809,751 | B2* | 11/2023 | Corrie | G06F 9/45558 |
| 11,908,168 | B2* | 2/2024 | Lee | G06T 9/001 |
| 2005/0204047 | A1 | 9/2005 | Mitchell et al. | |
| 2018/0173223 | A1* | 6/2018 | Doane | A63B 55/61 |
| 2019/0041848 | A1* | 2/2019 | Doane | G05D 1/0044 |
| 2019/0146772 | A1 | 5/2019 | Griffin et al. | |
| 2019/0171443 | A1 | 6/2019 | Nagae | |
| 2019/0235493 | A1* | 8/2019 | Doane | G05D 1/028 |
| 2021/0146950 | A1* | 5/2021 | Lee | B60W 60/001 |
| 2021/0232345 | A1* | 7/2021 | Corrie | G06F 3/0644 |
| 2021/0232418 | A1* | 7/2021 | Corrie | G06F 8/61 |
| 2022/0179592 | A1* | 6/2022 | Corrie | G06F 9/45558 |
| 2022/0335095 | A1* | 10/2022 | Fisher | H04L 67/02 |
| 2023/0050944 | A1* | 2/2023 | Martinez De La Cruz | |
| | | | | H04L 63/0435 |

OTHER PUBLICATIONS

Extended European Search Report in European Appln. No. 20886917.2, mailed on Dec. 14, 2023, 11 pages.

* cited by examiner

UPDATE OF SEAMLESS CONTAINER IN VEHICLES SYSTEM BASED ON CONTAINER

CROSS-REFERENCE TO RELATED APPLICATIONS

The present application claims the benefit of an earlier filing date and right of priority to U.S. Provisional Application No. 62/935,654, filed on Nov. 15, 2019, and the present application claims the benefit of an earlier filing date and right of priority to International Application No. PCT/KR2020/008539, filed on Jun. 30, 2020, the contents of which are hereby incorporated by reference in their entirety.

TECHNICAL FIELD

The disclosure relates to a method and device for updating a seamless container in a container-based vehicle system.

DISCUSSION OF RELATED ART

An autonomous vehicle refers to a vehicle that can drive by itself without operation by a driver or a passenger, and an automated vehicle & highway system refers to a system that monitors and controls such an autonomous vehicle to be able to drive by itself.

Autonomous vehicles come with a convenience system for providing various types of convenience to users. Vehicles provide services via various devices therein in association with a cloud environment. Various platforms have been developed to control the execution of such devices associated with a vehicle.

In particular, such an occasion may arise where a specific application needs to be updated while the user runs the application on a specific device in the vehicle. In such a case, conventional processor-based systems are required to end the service being provided so as to perform an update. Although the existing configuration is maintained, via the process type, only for a specific process at the start time, an update is limited from a system point of view. For web-based services, a new service is provided via an update scheme at the back end, and the GUI is updated according to the time of switching user screens. However, if no switch occurs between user screens, real-time has trouble.

SUMMARY

The disclosure aims to address the foregoing issues and/or needs.

According to an embodiment of the disclosure, there is provided a method for updating a container in a container-based vehicle system, which enables seamless use of user data while executing an updated container by storing user data, accumulated during the course of executing the container, in a user data registry.

According to an embodiment of the disclosure, there is provided a method for updating a container in a container-based vehicle system, which allows for a seamless container update by organically adjusting containers while a user uses a specific application by adjusting an interface between interlocked containers using a container management table.

According to an embodiment of the disclosure, a method for updating a container in a container-based vehicle system comprises executing the container, upon determining that the container needs to be updated, receiving a container image of an update target from a server, storing the container image of the update target in a system registry, generating a new container by combining a user data commit generated in the container and the container image of the update target, and updating the container using a container management table in which a container name and a source location are mapped to each other.

The user data commit may be data required to be maintained for runtime replacement while the container is executed.

The user data commit may be generated in a form of at least one of a file, a directory, or text.

The user data commit may be stored in a user data registry.

Upon recognizing of at least one of an adding of a new device to the vehicle, a removal of an existing device from the vehicle, a detection of a request for a specific version of application or a specific version of firmware for a device mounted in the vehicle, an adding of an updated application or updated firmware for the device mounted in the vehicle associated with a cloud environment, or an adding of an application with a new function using at least two or more devices associated with the cloud environment, the container may be determined to be needed to be updated.

The container update method in the container-based vehicle system may further comprise detecting a predetermined event meeting a container update condition while the container is executed, sending a request for a container update list to the server, and determining whether the container needs to be updated by analyzing the container update list.

The method may further comprise, upon determining that the container needs to be replaced as a result of determining whether the container needs to be updated while a first container is executed, transmitting a type of data used by the container to the server, receiving a replaceable second container from the server, and controlling to switch an approach path of vehicle data from the first container to the second container.

The method may further comprise generating, by the first container, the user data commit in response to a request for data used by the first container from the second container.

The container update method in the container-based vehicle system may further comprise requesting the container to prepare for an update, generating the user data commit via the container, and storing the generated user data commit in a user data registry.

The container update method in the container-based vehicle system may further comprise interlocking a running process for controlling the execution of the container and the new container and synchronizing runtime data via the user data commit included in the new container and executing the running process from the new container.

The method may further comprise, when the interlocking of the running process is complete, updating the container management table to allow a source address of the new container to be matched a name of the container Updating the container management table may include deleting a name of the new container and a source address matched to the name of the new container.

The container update method in the container-based vehicle system may further comprise deleting the container before the container is updated and deleting the user data commit stored in the user data registry.

According to an embodiment of the disclosure, a vehicle system comprises a container storage unit storing a container including data and a system library, and at least one program for controlling an execution of an application executable in a vehicle, a system registry storing a system container image, a user data registry storing user data generated while executing the container, and a processor functionally connected with the container storage unit, the system registry, and the user data registry and controlling an update of the container, wherein the processor drives the container and, upon determining that the container needs to be updated, receives a container image of an update target from a server, stores the container image of the update target in the system registry, generates a new container by combining a user data commit generated in the container and the container image of the update target, and updates the container using a container management table in which a container name and a source location are mapped to each other.

The user data commit may be data required to be maintained for runtime replacement while the container is executed.

The user data commit may be generated in a form of at least one of a file, a directory, or text.

The processor may detect a predetermined event meeting a container update condition while the container is executed, send a request for a container update list to the server, and determine whether the container needs to be updated by analyzing the container update list.

The processor may request the container to prepare for an update, generate the user data commit via the container, and store the generated user data commit in the user data registry.

The processor may interlock a running process for controlling the execution of the container and the new container and synchronize runtime data via the user data commit included in the new container and execute the running process from the new container.

When the interlocking of the running process is complete, the processor may update the container management table to allow the source address of the new container to be matched to the name of the container.

According to an embodiment of the disclosure, it is possible to enable seamless use of user data while executing an updated container by storing user data, accumulated during the course of executing the container, in a user data registry.

According to an embodiment of the disclosure, it is possible to allow for a seamless container update by organically adjusting containers while a user uses a specific application by adjusting an interface between interlocked containers using a container management table.

DETAILED DESCRIPTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the disclosure would unnecessarily obscure the gist of the disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

1. Driving (1) Exterior of Vehicle

Figure 1:
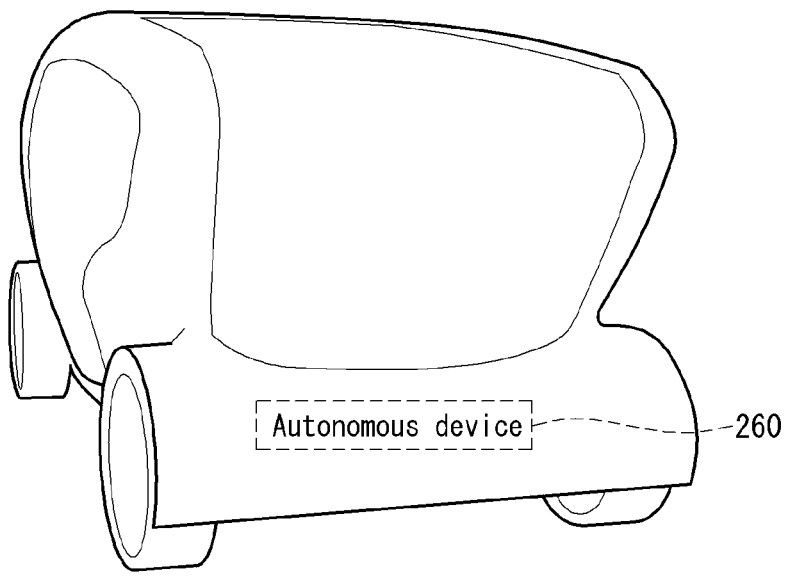
FIG. 1 illustrates a vehicle according to an embodiment of the disclosure.
Figure 1:
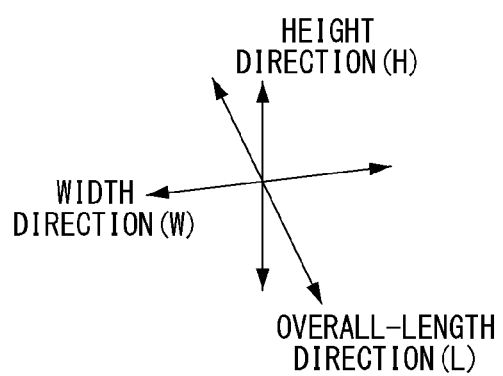

FIG. 1 is a diagram showing a vehicle according to an embodiment of the disclosure.

Referring to FIG. 1, a vehicle 10 according to an embodiment of the disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

Figure 2:
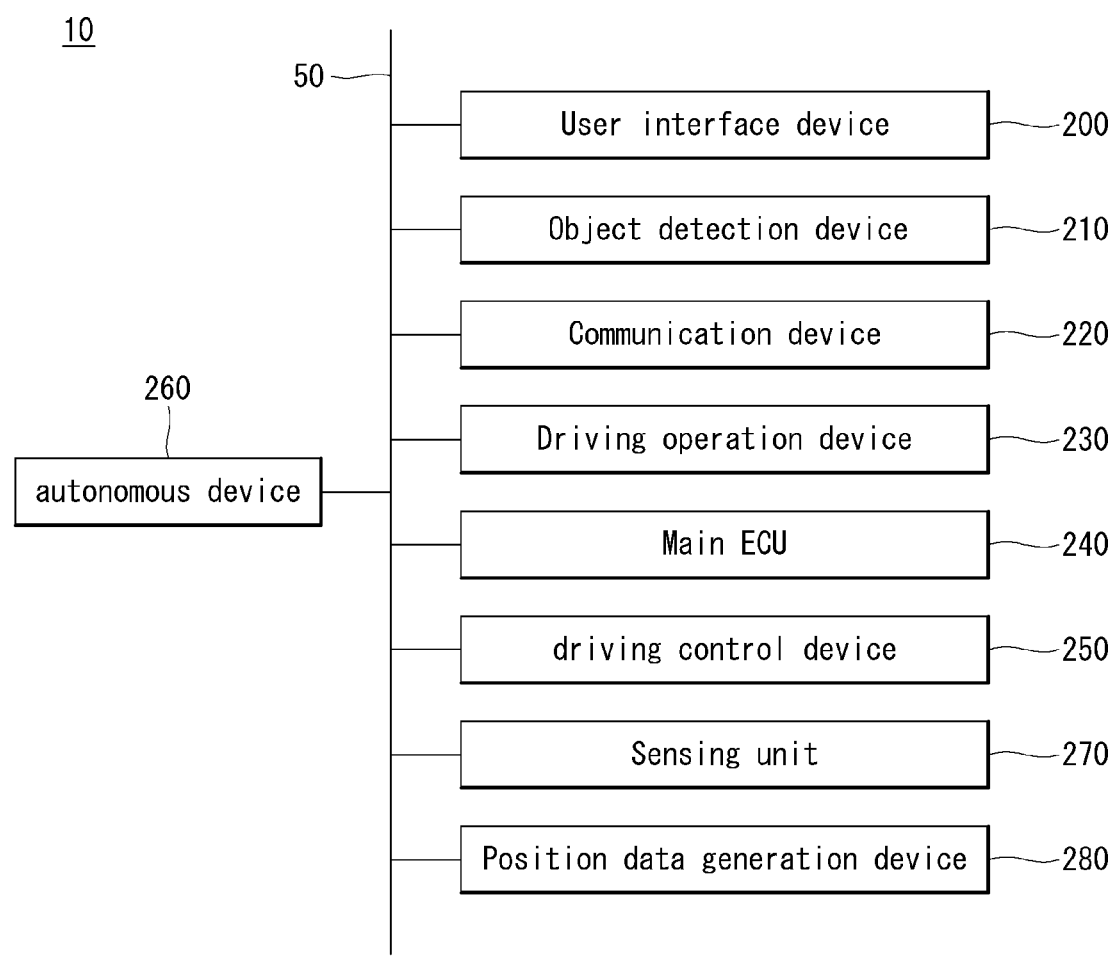
FIG. 2 is a control block diagram of the vehicle according to an embodiment of the disclosure.

FIG. 2 is a control block diagram of the vehicle according to an embodiment of the disclosure.

Referring to FIG. 2, the vehicle 10 may include a user interface device 200, an object detection device 210, a communication device 220, a driving operation device 230, a main ECU 240, a driving control device 250, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3) Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous device 260. For example, the driving control device 250 can control a power train, a steering device and a brake device on the basis of signals received by the autonomous device 260.

7) Autonomous Device

The autonomous device 260 can generate a route for self-driving on the basis of acquired data. The autonomous device 260 can generate a driving plan for traveling along the generated route. The autonomous device 260 can generate a signal for controlling movement of the vehicle according to the driving plan. The autonomous device 260 can provide the signal to the driving control device 250.

The autonomous device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 can perform switching from a self-driving mode to a manual driving mode or switching from the manual driving mode to the self-driving mode. For example, the autonomous device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

(3) Components of Autonomous Device

Figure 3:
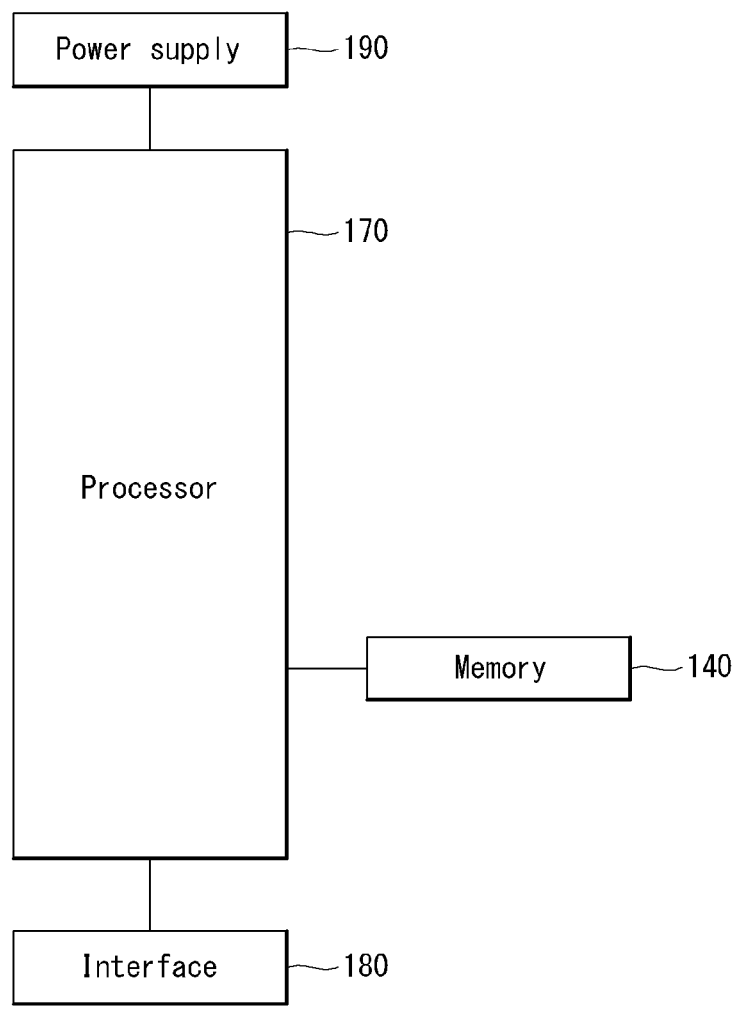
FIG. 3 is a control block diagram of an autonomous device according to an embodiment of the disclosure.

FIG. 3 is a control block diagram of the autonomous device according to an embodiment of the disclosure.

Referring to FIG. 3, the autonomous device 260 may include a memory 140, a processor 170, an interface 180 and a power supply 190.

The memory 140 is electrically connected to the processor 170. The memory 140 can store basic data with respect to units, control data for operation control of units, and input/output data. The memory 140 can store data processed in the processor 170. Hardware-wise, the memory 140 can be configured as at least one of a ROM, a RAM, an EPROM, a flash drive and a hard drive. The memory 140 can store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 can exchange signals with at least one electronic device included in the vehicle 10 in a wired or wireless manner. The interface 180 can exchange signals with at least one of the object detection device 210, the communication device 220, the driving operation device 230, the main ECU 240, the driving control device 250, the sensing unit 270 and the position data generation device 280 in a wired or wireless manner. The interface 180 can be configured using at least one of a communication module, a terminal, a pin, a cable, a port, a circuit, an element and a device.

The power supply 190 can provide power to the autonomous device 260. The power supply 190 can be provided with power from a power source (e.g., a battery) included in the vehicle 10 and supply the power to each unit of the autonomous device 260. The power supply 190 can operate according to a control signal supplied from the main ECU 240. The power supply 190 may include a switched-mode power supply (SMPS).

The processor 170 can be electrically connected to the memory 140, the interface 180 and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal and provide the signal while power is supplied thereto.

The processor 170 can receive information from other electronic devices included in the vehicle 10 through the interface 180. The processor 170 can provide control signals to other electronic devices in the vehicle 10 through the interface 180.

The autonomous device 260 may include at least one printed circuit board (PCB). The memory 140, the interface 180, the power supply 190 and the processor 170 may be electrically connected to the PCB.

(4) Operation of Autonomous Device

Figure 4:
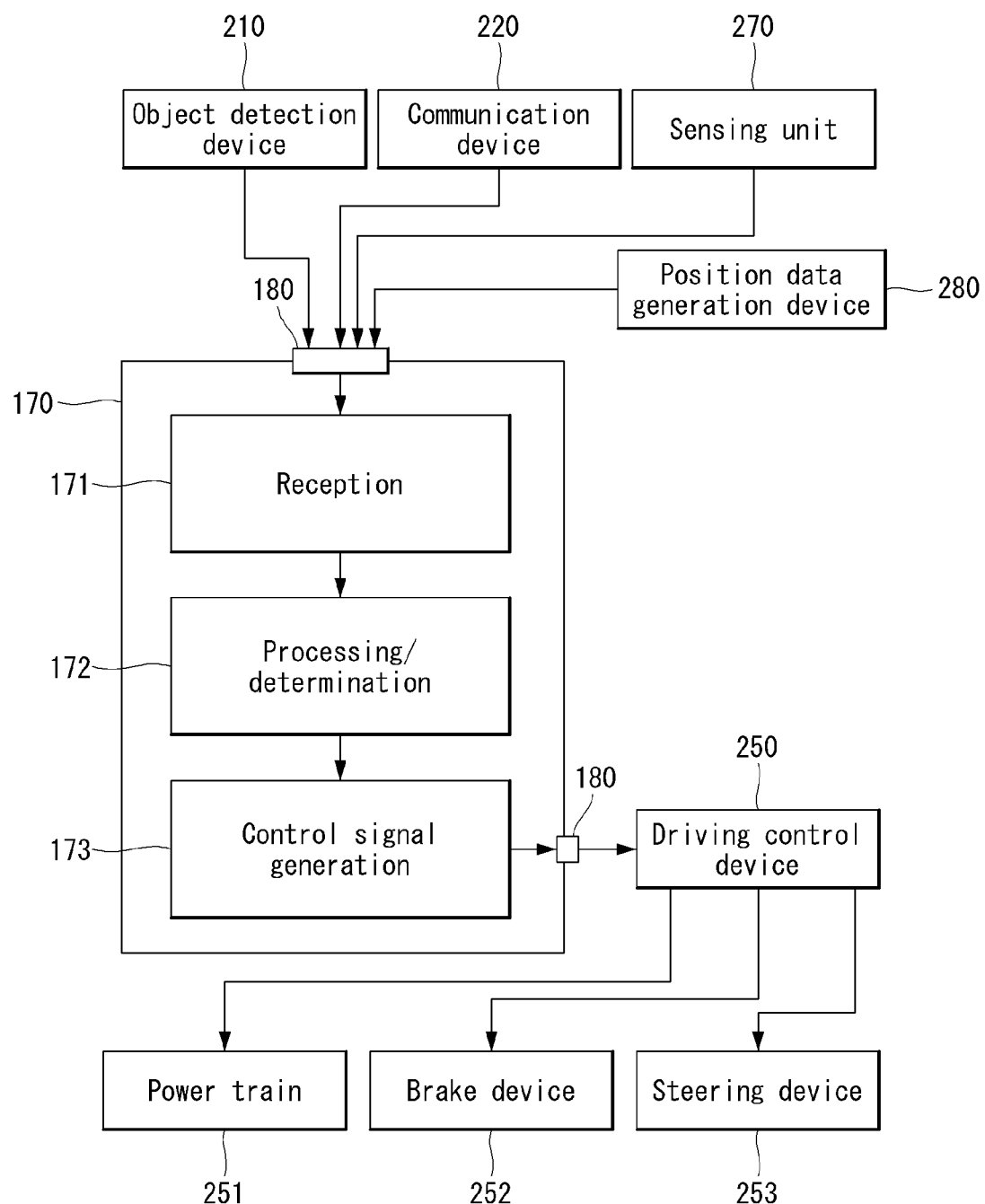
FIG. 4 is a diagram showing a signal flow in an autonomous vehicle according to an embodiment of the disclosure.

FIG. 4 is a diagram showing a signal flow in an autonomous vehicle according to an embodiment of the disclosure.

1) Reception Operation

Referring to FIG. 4, the processor 170 can perform a reception operation. The processor 170 can receive data from at least one of the object detection device 210, the communication device 220, the sensing unit 270 and the position data generation device 280 through the interface 180. The processor 170 can receive object data from the object detection device 210. The processor 170 can receive HD map data from the communication device 220. The processor 170 can receive vehicle state data from the sensing unit 270. The processor 170 can receive position data from the position data generation device 280.

2) Processing/Determination Operation

The processor 170 can perform a processing/determination operation. The processor 170 can perform the processing/determination operation on the basis of traveling situation information. The processor 170 can perform the processing/determination operation on the basis of at least one of object data, HD map data, vehicle state data and position data.

2.1) Driving Plan Data Generation Operation

The processor 170 can generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located on the basis of a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data can include a main path and a sub-path. The main path may be understood as a trajectory obtained by connecting roads having a high relative probability of being selected. The sub-path can be branched from at least one decision point on the main path. The sub-path may be understood as a trajectory obtained by connecting at least one road having a low relative probability of being selected at at least one decision point on the main path.

3) Control Signal Generation Operation

The processor 170 can perform a control signal generation operation. The processor 170 can generate a control signal on the basis of the electronic horizon data. For example, the processor 170 may generate at least one of a power train control signal, a brake device control signal and a steering device control signal on the basis of the electronic horizon data.

The processor 170 can transmit the generated control signal to the driving control device 250 through the interface 180. The driving control device 250 can transmit the control signal to at least one of a power train 251, a brake device 252 and a steering device 254.

2. Cabin

Figure 5:
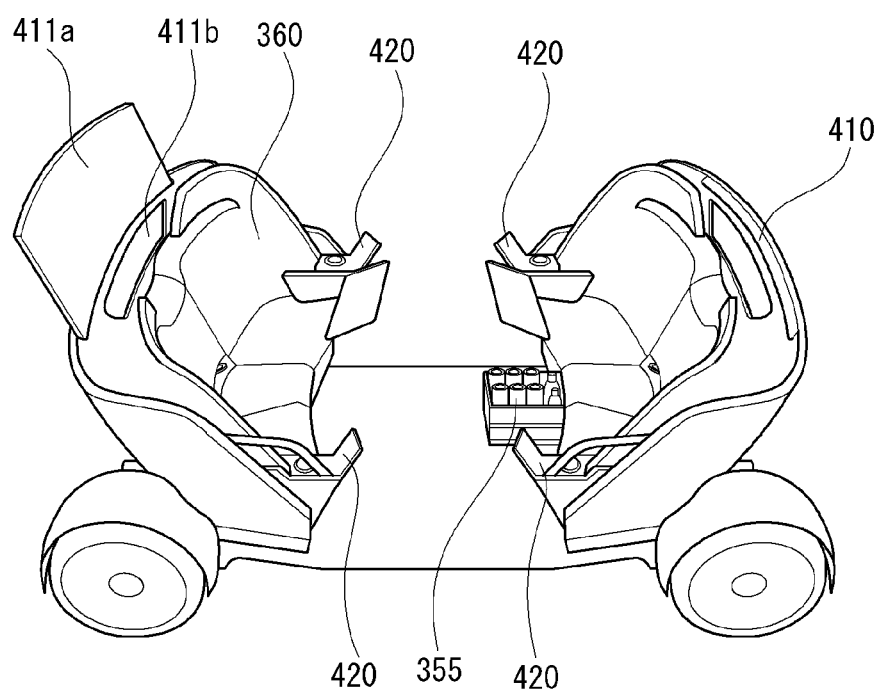
FIG. 5 is a diagram illustrating the interior of a vehicle according to an embodiment of the disclosure.

FIG. 5 is a diagram showing the interior of the vehicle according to an embodiment of the disclosure.

Figure 6:
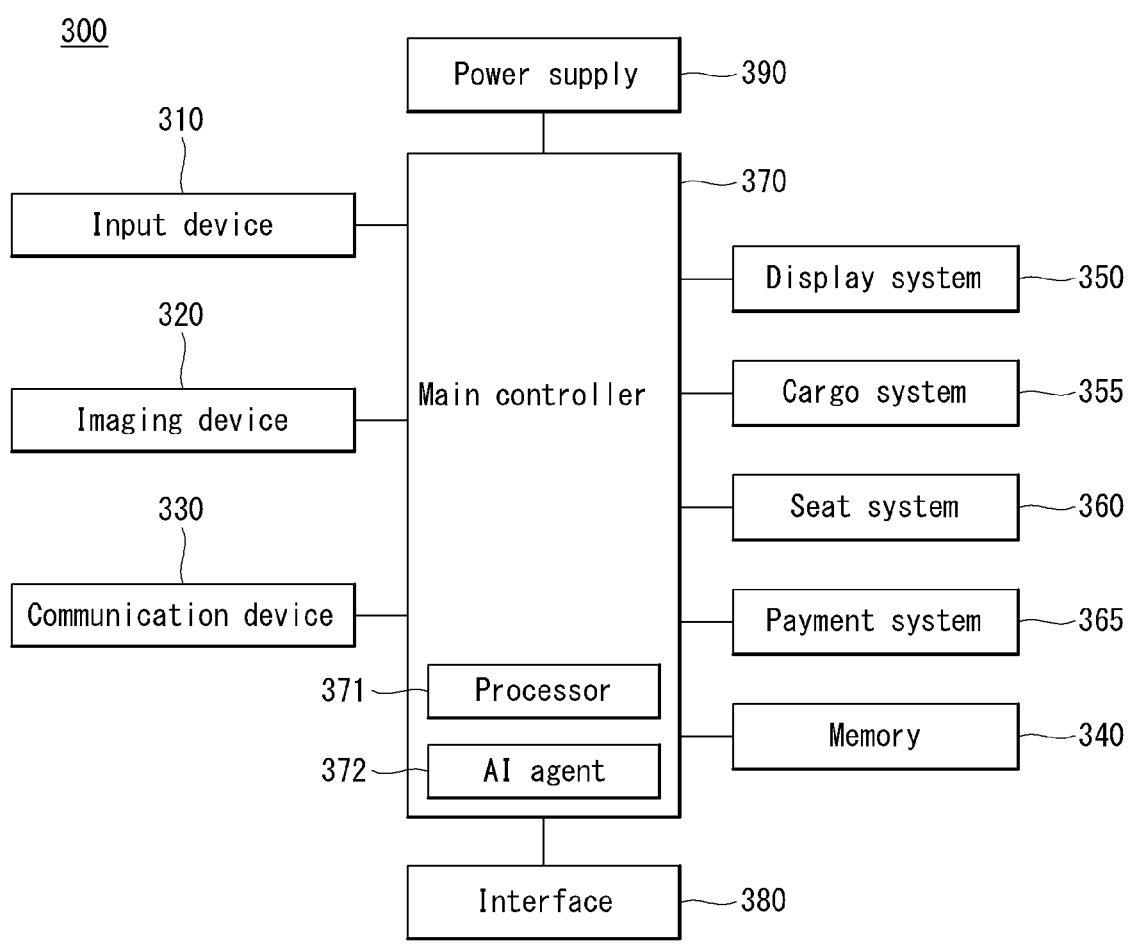
FIG. 6 is a block diagram referred to in description of a cabin system for a vehicle according to an embodiment of the disclosure.

FIG. 6 is a block diagram referred to in description of a cabin system for a vehicle according to an embodiment of the disclosure.

(1) Components of Cabin

Referring to FIGS. 5 and 6, a cabin system 300 for a vehicle (hereinafter, a cabin system) can be defined as a convenience system for a user who uses the vehicle 10. The cabin system 300 can be explained as a high-end system including a display system 350, a cargo system 355, a seat system 360 and a payment system 365. The cabin system 300 may include a main controller 370, a memory 340, an interface 380, a power supply 390, an input device 310, an imaging device 320, a communication device 330, the display system 350, the cargo system 355, the seat system 360 and the payment system 365. The cabin system 300 may further include components in addition to the components described in this specification or may not include some of the components described in this specification according to embodiments.

1) Main Controller

The main controller 370 can be electrically connected to the input device 310, the communication device 330, the display system 350, the cargo system 355, the seat system 360 and the payment system 365 and exchange signals with these components. The main controller 370 can control the input device 310, the communication device 330, the display system 350, the cargo system 355, the seat system 360 and the payment system 365. The main controller 370 may be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The main controller 370 may be configured as at least one sub-controller. The main controller 370 may include a plurality of sub-controllers according to an embodiment. The plurality of sub-controllers may individually control the devices and systems included in the cabin system 300. The devices and systems included in the cabin system 300 may be grouped by function or grouped on the basis of seats on which a user can sit.

The main controller 370 may include at least one processor 371. Although FIG. 6 illustrates the main controller 370 including a single processor 371, the main controller 371 may include a plurality of processors. The processor 371 may be categorized as one of the above-described sub-controllers.

The processor 371 can receive signals, information or data from a user terminal through the communication device 330. The user terminal can transmit signals, information or data to the cabin system 300.

The processor 371 can identify a user on the basis of image data received from at least one of an internal camera and an external camera included in the imaging device. The processor 371 can identify a user by applying an image processing algorithm to the image data. For example, the processor 371 may identify a user by comparing information received from the user terminal with the image data. For example, the information may include at least one of route information, body information, fellow passenger information, baggage information, position information, preferred content information, preferred food information, disability information and use history information of a user.

The main controller 370 may include an artificial intelligence (AI) agent 372. The AI agent 372 can perform machine learning on the basis of data acquired through the input device 310. The AI agent 371 can control at least one of the display system 350, the cargo system 355, the seat system 360 and the payment system 365 on the basis of machine learning results.

2) Essential Components

The memory 340 is electrically connected to the main controller 370. The memory 340 can store basic data about units, control data for operation control of units, and input/output data. The memory 340 can store data processed in the main controller 370. Hardware-wise, the memory 340 may be configured using at least one of a ROM, a RAM, an EPROM, a flash drive and a hard drive. The memory 340 can store various types of data for the overall operation of the cabin system 300, such as a program for processing or control of the main controller 370. The memory 340 may be integrated with the main controller 370.

The interface 380 can exchange signals with at least one electronic device included in the vehicle 10 in a wired or wireless manner. The interface 380 may be configured using at least one of a communication module, a terminal, a pin, a cable, a port, a circuit, an element and a device.

The power supply 390 can provide power to the cabin system 300. The power supply 390 can be provided with power from a power source (e.g., a battery) included in the vehicle 10 and supply the power to each unit of the cabin system 300. The power supply 390 can operate according to a control signal supplied from the main controller 370. For example, the power supply 390 may be implemented as a switched-mode power supply (SMPS).

The cabin system 300 may include at least one printed circuit board (PCB). The main controller 370, the memory 340, the interface 380 and the power supply 390 may be mounted on at least one PCB.

3) Input Device

The input device 310 can receive a user input. The input device 310 can convert the user input into an electrical signal. The electrical signal converted by the input device 310 can be converted into a control signal and provided to at least one of the display system 350, the cargo system 355, the seat system 360 and the payment system 365. The main controller 370 or at least one processor included in the cabin system 300 can generate a control signal based on an electrical signal received from the input device 310.

The input device 310 may include at least one of a touch input unit, a gesture input unit, a mechanical input unit and a voice input unit. The touch input unit can convert a user's touch input into an electrical signal. The touch input unit may include at least one touch sensor for detecting a user's touch input. According to an embodiment, the touch input unit can realize a touch screen by integrating with at least one display included in the display system 350. Such a touch screen can provide both an input interface and an output interface between the cabin system 300 and a user. The gesture input unit can convert a user's gesture input into an electrical signal. The gesture input unit may include at least one of an infrared sensor and an image sensor for detecting a user's gesture input. According to an embodiment, the gesture input unit can detect a user's three-dimensional gesture input. To this end, the gesture input unit may include a plurality of light output units for outputting infrared light or a plurality of image sensors. The gesture input unit may detect a user's three-dimensional gesture input using TOF (Time of Flight), structured light or disparity. The mechanical input unit can convert a user's physical input (e.g., press or rotation) through a mechanical device into an electrical signal. The mechanical input unit may include at least one of a button, a dome switch, a jog wheel and a jog switch. Meanwhile, the gesture input unit and the mechanical input unit may be integrated. For example, the input device 310 may include a jog dial device that includes a gesture sensor and is formed such that it can be inserted/ejected into/from a part of a surrounding structure (e.g., at least one of a seat, an armrest and a door). When the jog dial device is parallel to the surrounding structure, the jog dial device can serve as a gesture input unit. When the jog dial device is protruded from the surrounding structure, the jog dial device can serve as a mechanical input unit. The voice input unit can convert a user's voice input into an electrical signal. The voice input unit may include at least one microphone. The voice input unit may include a beam forming MIC.

4) Imaging Device

The imaging device 320 can include at least one camera. The imaging device 320 may include at least one of an internal camera and an external camera. The internal camera can capture an image of the inside of the cabin. The external camera can capture an image of the outside of the vehicle. The internal camera can acquire an image of the inside of the cabin. The imaging device 320 may include at least one internal camera. It is desirable that the imaging device 320 include as many cameras as the number of passengers who can ride in the vehicle. The imaging device 320 can provide an image acquired by the internal camera. The main controller 370 or at least one processor included in the cabin system 300 can detect a motion of a user on the basis of an image acquired by the internal camera, generate a signal on the basis of the detected motion and provide the signal to at least one of the display system 350, the cargo system 355, the seat system 360 and the payment system 365. The external camera can acquire an image of the outside of the vehicle. The imaging device 320 may include at least one external camera. It is desirable that the imaging device 320 include as many cameras as the number of doors through which passengers ride in the vehicle. The imaging device 320 can provide an image acquired by the external camera. The main controller 370 or at least one processor included in the cabin system 300 can acquire user information on the basis of the image acquired by the external camera. The main controller 370 or at least one processor included in the cabin system 300 can authenticate a user or acquire body information (e.g., height information, weight information, etc.), fellow passenger information and baggage information of a user on the basis of the user information.

5) Communication Device

The communication device 330 can exchange signals with external devices in a wireless manner. The communication device 330 can exchange signals with external devices through a network or directly exchange signals with external devices. External devices may include at least one of a server, a mobile terminal and another vehicle. The communication device 330 may exchange signals with at least one user terminal. The communication device 330 may include an antenna and at least one of an RF circuit and an RF element which can implement at least one communication protocol in order to perform communication. According to an embodiment, the communication device 330 may use a plurality of communication protocols. The communication device 330 may switch communication protocols according to a distance to a mobile terminal. For example, the communication device can exchange signals with external devices on the basis of C-V2X (Cellular V2X). For example, C-V2X may include sidelink communication based on LTE and/or sidelink communication based on NR. Details related to C-V2X will be described later. For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards). The communication device of the disclosure can exchange signals with external devices using only one of C-V2X and DSRC. Alternatively, the communication device of the disclosure can exchange signals with external devices using a hybrid of C-V2X and DSRC.

6) Display System

The display system 350 can display graphic objects. The display system 350 may include at least one display device. For example, the display system 350 may include a first display device 410 for common use and a second display device 420 for individual use.

6.1) Common Display Device

The first display device 410 may include at least one display 411 which outputs visual content. The display 411 included in the first display device 410 may be realized by at least one of a flat panel display, a curved display, a rollable display and a flexible display. For example, the first display device 410 may include a first display 411 which is positioned behind a seat and formed to be inserted/ejected into/from the cabin, and a first mechanism for moving the first display 411. The first display 411 may be disposed such that it can be inserted/ejected into/from a slot formed in a seat main frame. According to an embodiment, the first display device 410 may further include a flexible area control mechanism. The first display may be formed to be flexible and a flexible area of the first display may be controlled according to user position. For example, the first display device 410 may be disposed on the ceiling inside the cabin and include a second display formed to be rollable and a second mechanism for rolling or unrolling the second display. The second display may be formed such that images can be displayed on both sides thereof. For example, the first display device 410 may be disposed on the ceiling inside the cabin and include a third display formed to be flexible and a third mechanism for bending or unbending the third display. According to an embodiment, the display system 350 may further include at least one processor which provides a control signal to at least one of the first display device 410 and the second display device 420. The processor included in the display system 350 can generate a control signal on the basis of a signal received from at last one of the main controller 370, the input device 310, the imaging device 320 and the communication device 330.

A display area of a display included in the first display device 410 may be divided into a first area 411a and a second area 411b. The first area 411a can be defined as a content display area. For example, the first area 411 may display at least one of graphic objects corresponding to can display entertainment content (e.g., movies, sports, shopping, food, etc.), video conferences, food menu and augmented reality screens. The first area 411a may display graphic objects corresponding to traveling situation information of the vehicle 10. The traveling situation information may include at least one of object information outside the vehicle, navigation information and vehicle state information. The object information outside the vehicle may include information on presence or absence of an object, positional information of an object, information on a distance between the vehicle and an object, and information on a relative speed of the vehicle with respect to an object. The navigation information may include at least one of map information, information on a set destination, route information according to setting of the destination, information on various objects on a route, lane information and information on the current position of the vehicle. The vehicle state information may include vehicle attitude information, vehicle speed information, vehicle tilt information, vehicle weight information, vehicle orientation information, vehicle battery information, vehicle fuel information, vehicle tire pressure information, vehicle steering information, vehicle indoor temperature information, vehicle indoor humidity information, pedal position information, vehicle engine temperature information, etc. The second area 411b can be defined as a user interface area. For example, the second area 411b may display an AI agent screen. The second area 411b may be located in an area defined by a seat frame according to an embodiment. In this case, a user can view content displayed in the second area 411b between seats. The first display device 410 may provide hologram content according to an embodiment. For example, the first display device 410 may provide hologram content for each of a plurality of users such that only a user who requests the content can view the content.

6.2) Display Device for Individual Use

The second display device 420 can include at least one display 421. The second display device 420 can provide the display 421 at a position at which only an individual passenger can view display content. For example, the display 421 may be disposed on an armrest of a seat. The second display device 420 can display graphic objects corresponding to personal information of a user. The second display device 420 may include as many displays 421 as the number of passengers who can ride in the vehicle. The second display device 420 can realize a touch screen by forming a layered structure along with a touch sensor or being integrated with the touch sensor. The second display device 420 can display graphic objects for receiving a user input for seat adjustment or indoor temperature adjustment.

7) Cargo System

The cargo system 355 can provide items to a user at the request of the user. The cargo system 355 can operate on the basis of an electrical signal generated by the input device 310 or the communication device 330. The cargo system 355 can include a cargo box. The cargo box can be hidden in a part under a seat. When an electrical signal based on user input is received, the cargo box can be exposed to the cabin. The user can select a necessary item from articles loaded in the cargo box. The cargo system 355 may include a sliding moving mechanism and an item pop-up mechanism in order to expose the cargo box according to user input. The cargo system 355 may include a plurality of cargo boxes in order to provide various types of items. A weight sensor for determining whether each item is provided may be embedded in the cargo box.

8) Seat System

The seat system 360 can provide a user customized seat to a user. The seat system 360 can operate on the basis of an electrical signal generated by the input device 310 or the communication device 330. The seat system 360 can adjust at least one element of a seat on the basis of acquired user body data. The seat system 360 may include a user detection sensor (e.g., a pressure sensor) for determining whether a user sits on a seat. The seat system 360 may include a plurality of seats on which a plurality of users can sit. One of the plurality of seats can be disposed to face at least another seat. At least two users can set facing each other inside the cabin.

9) Payment System

The payment system 365 can provide a payment service to a user. The payment system 365 can operate on the basis of an electrical signal generated by the input device 310 or the communication device 330. The payment system 365 can calculate a price for at least one service used by the user and request the user to pay the calculated price.

(2) Autonomous Vehicle Usage Scenarios

Figure 7:
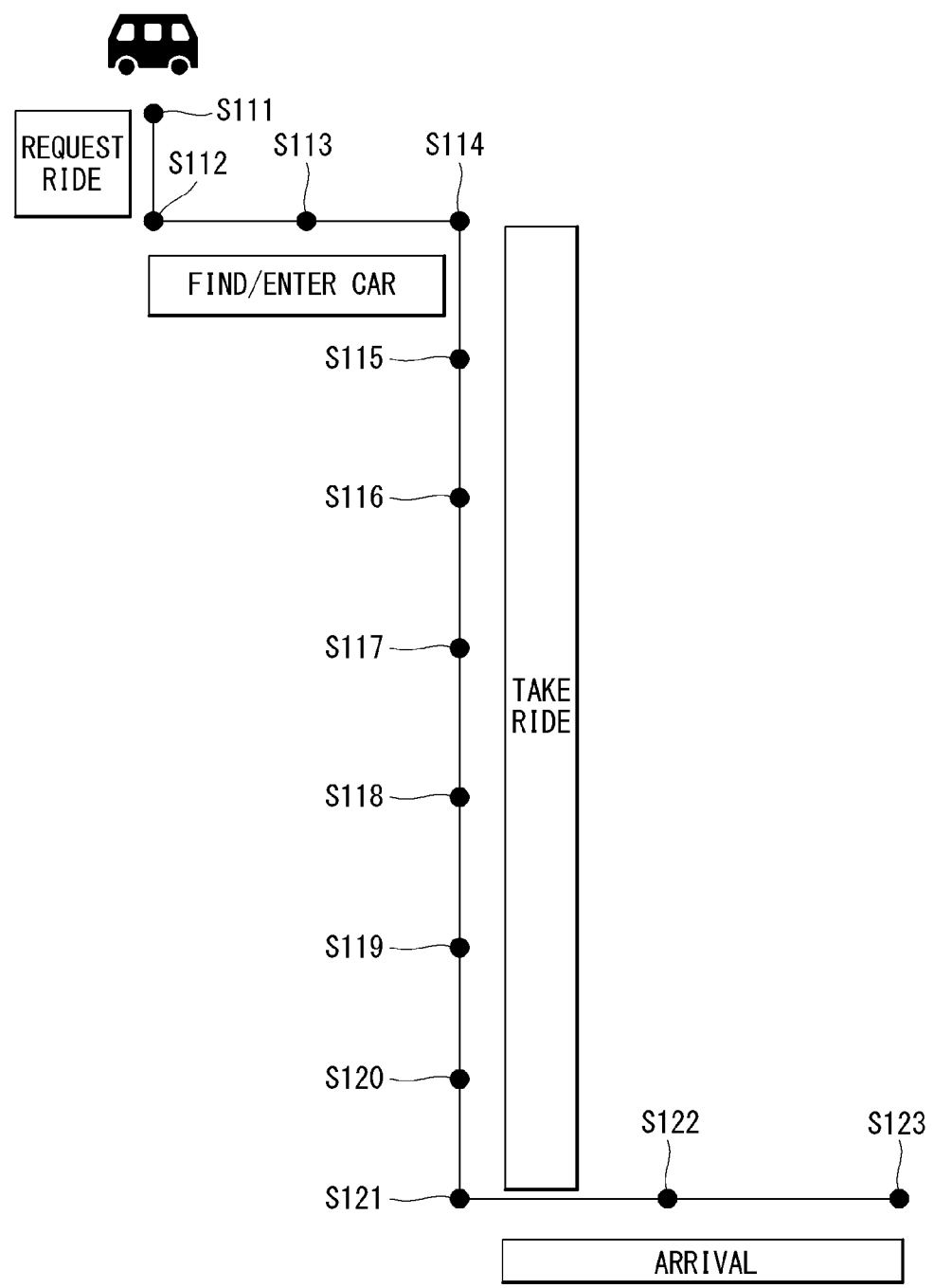
FIG. 7 is a diagram for describing a use scenario of a user according to an embodiment of the disclosure.

FIG. 7 is a diagram referred to in description of a usage scenario of a user according to an embodiment of the disclosure.

1) Destination Prediction Scenario

A first scenario S111 is a scenario for prediction of a destination of a user. An application which can operate in connection with the cabin system 300 can be installed in a user terminal. The user terminal can predict a destination of a user on the basis of user's contextual information through the application. The user terminal can provide information on unoccupied seats in the cabin through the application.

2) Cabin Interior Layout Preparation Scenario

A second scenario S112 is a cabin interior layout preparation scenario. The cabin system 300 may further include a scanning device for acquiring data about a user located outside the vehicle. The scanning device can scan a user to acquire body data and baggage data of the user. The body data and baggage data of the user can be used to set a layout. The body data of the user can be used for user authentication. The scanning device may include at least one image sensor. The image sensor can acquire a user image using light of the visible band or infrared band.

The seat system 360 can set a cabin interior layout on the basis of at least one of the body data and baggage data of the user. For example, the seat system 360 may provide a baggage compartment or a car seat installation space.

3) User Welcome Scenario

A third scenario S113 is a user welcome scenario. The cabin system 300 may further include at least one guide light. The guide light can be disposed on the floor of the cabin. When a user riding in the vehicle is detected, the cabin system 300 can turn on the guide light such that the user sits on a predetermined seat among a plurality of seats. For example, the main controller 370 may realize a moving light by sequentially turning on a plurality of light sources over time from an open door to a predetermined user seat.

4) Seat Adjustment Service Scenario

A fourth scenario S114 is a seat adjustment service scenario. The seat system 360 can adjust at least one element of a seat that matches a user on the basis of acquired body information.

5) Personal Content Provision Scenario

A fifth scenario S115 is a personal content provision scenario. The display system 350 can receive user personal data through the input device 310 or the communication device 330. The display system 350 can provide content corresponding to the user personal data.

6) Item Provision Scenario

A sixth scenario S116 is an item provision scenario. The cargo system 355 can receive user data through the input device 310 or the communication device 330. The user data may include user preference data, user destination data, etc. The cargo system 355 can provide items on the basis of the user data.

7) Payment Scenario

A seventh scenario S117 is a payment scenario. The payment system 365 can receive data for price calculation from at least one of the input device 310, the communication device 330 and the cargo system 355. The payment system 365 can calculate a price for use of the vehicle by the user on the basis of the received data. The payment system 365 can request payment of the calculated price from the user (e.g., a mobile terminal of the user).

8) Display System Control Scenario of User

An eighth scenario S118 is a display system control scenario of a user. The input device 310 can receive a user input having at least one form and convert the user input into an electrical signal. The display system 350 can control displayed content on the basis of the electrical signal.

9) AI Agent Scenario

A ninth scenario S119 is a multi-channel artificial intelligence (AI) agent scenario for a plurality of users. The AI agent 372 can discriminate user inputs from a plurality of users. The AI agent 372 can control at least one of the display system 350, the cargo system 355, the seat system 360 and the payment system 365 on the basis of electrical signals obtained by converting user inputs from a plurality of users.

10) Multimedia Content Provision Scenario for Multiple Users

A tenth scenario S120 is a multimedia content provision scenario for a plurality of users. The display system 350 can provide content that can be viewed by all users together. In this case, the display system 350 can individually provide the same sound to a plurality of users through speakers provided for respective seats. The display system 350 can provide content that can be individually viewed by a plurality of users. In this case, the display system 350 can provide individual sound through a speaker provided for each seat.

11) User Safety Secure Scenario

An eleventh scenario S121 is a user safety secure scenario. When information on an object around the vehicle which threatens a user is acquired, the main controller 370 can control an alarm with respect to the object around the vehicle to be output through the display system 350.

12) Personal Belongings Loss Prevention Scenario

A twelfth scenario S122 is a user's belongings loss prevention scenario. The main controller 370 can acquire data about user's belongings through the input device 310. The main controller 370 can acquire user motion data through the input device 310. The main controller 370 can determine whether the user exits the vehicle leaving the belongings in the vehicle on the basis of the data about the belongings and the motion data. The main controller 370 can control an alarm with respect to the belongings to be output through the display system 350.

13) Alighting Report Scenario

A thirteenth scenario S123 is an alighting report scenario. The main controller 370 can receive alighting data of a user through the input device 310. After the user exits the vehicle, the main controller 370 can provide report data according to alighting to a mobile terminal of the user through the communication device 330. The report data can include data about a total charge for using the vehicle 10.

Container

A container may be a lightweight virtualization instance that is executed in a computer system instance including a program, data, and system libraries. When the container is executed, the program (i.e., process) being executed may be executed independently from other processes being executed in the same computer system instance.

Each container may have its own unique namespace. The applications executed in the containers may be in the state of being able to access only the resources available in the container namespace. Accordingly, the containers may be an effective manner for executing at least one single application in the unique namespace.

A container package enables at least one container to be executed in a single operation instance without overhead that may be consumed to start and maintain virtual machines for executing a separate user space instance. An example of the container package may be a Docker container engine.

The container may be created using the Java language and may be a servlet container as software capable of executing an application program using JSP and Servlet.

There may be various types of containers, such as Servlet containers, JSP containers, or EJB containers, and representative containers may include Jakarta Tomcat (JSP), RESIN, WebLogic, or WebtoB. The container may be in the form of a web browser that opens or stores webpages over the Internet.

A container engine may place an application in the container. The container engine may be Docker, but is not necessarily limited thereto.

Figure 8:
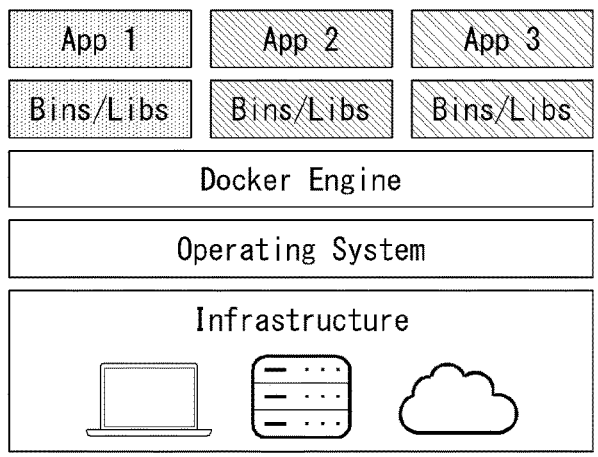
FIG. 8 is a view illustrating a container-based system architecture according to an embodiment of the disclosure.

FIG. 8 is a view illustrating a container-based system architecture according to an embodiment of the disclosure.

Referring to FIG. 8, a virtual machine generally provides isolation in such a manner as to allocate one operating system instance to each application required to be compartmentalized. The isolation provided by the virtual machine is a method that is capable of nearly complete isolation, but comes at a significant cost. This is why each operating system instance consumes the memory and processing power that may be more effectively allocated to the application itself.

However, in the case of containers, each application and its dependencies use separate segments of operating system resources. The container runtime may set up or delete containers using low-level container services provided by the host operating system.

Among the Linux kernel features that create a wall between the containers and other processes running on the host are cgroups (control groups) and namespaces. The cgroup manages the system resource usage of the process group, such as isolation, CPU, and memory. The namespace processes resource isolation of one process, and the cgroup manages the resource of the process group. As the cgroup and the namespace are combined together, a Linux container (LXC) may be implemented.

The Linux container is a Linux OS level virtualization scheme, which executes the Linux systems into which a single host is divided. The container isolates applications in the operating system. In other words, this means that, while running a minimized Linux operating system, the user may execute all others in one or more isolated containers.

Docker increases the mobility and flexibility of the container in the Linux container. Use of a Docker container enables workloads to be distributed, copied, moved, and backed up in an easier and quicker manner than when the virtual machine is used. Docker provides such a degree of flexibility as that of the cloud in all infrastructures that may execute the container.

Docker generates a container image that corresponds to the 'specifications' for the software scheme that is to be executed in a specific container. The image library may be built up using the container image tool of Docker, and images may be converted into a new image, and an app may be executed with the image via a local or remote infrastructure.

Docker orchestrates the operation between containers, thereby allowing for connection of containers and building up an application stack. This may be developed into container orchestration provided by third-party products.

Further, Linux containers may build APIs and ecosystems so that developers may use containers in a wider variety and, as an example, it was developed in the form of its own runtime, Libcontainer. Libcontainer may provide more various service layers to containers. Docker is a Linux or Windows utility that may efficiently generate, ship, and execute containers.

The applications App1, App2, and App3 shown in FIG. 8 as an example may mean containers for supporting navigation, multi-media, connectivity, voice assistance, or such services. Each container is built on a Docker engine and shares the Linux kernel.

Figure 9:
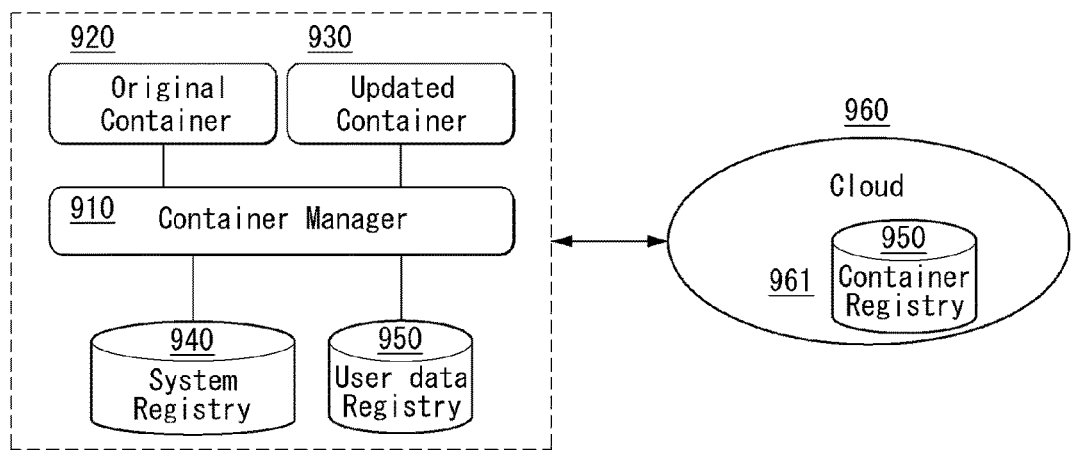
FIG. 9 is a view schematically illustrating a system configuration for implementing a method for updating a container in a container-based vehicle system according to an embodiment of the disclosure.
Figure 10:
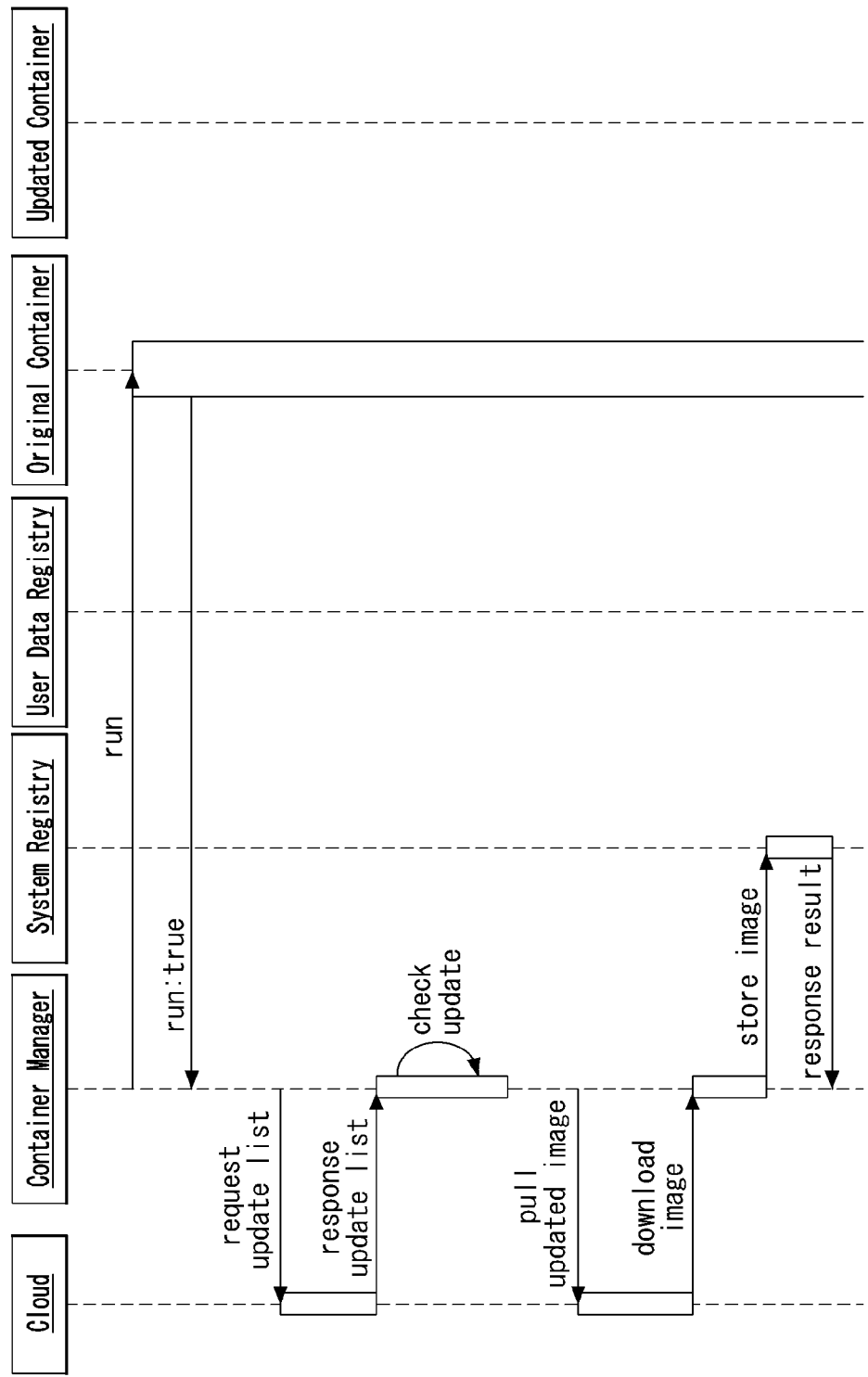
FIGS. 10 and 11 are sequence diagrams illustrating an example of updating a container according to an embodiment of the disclosure.
Figure 11:
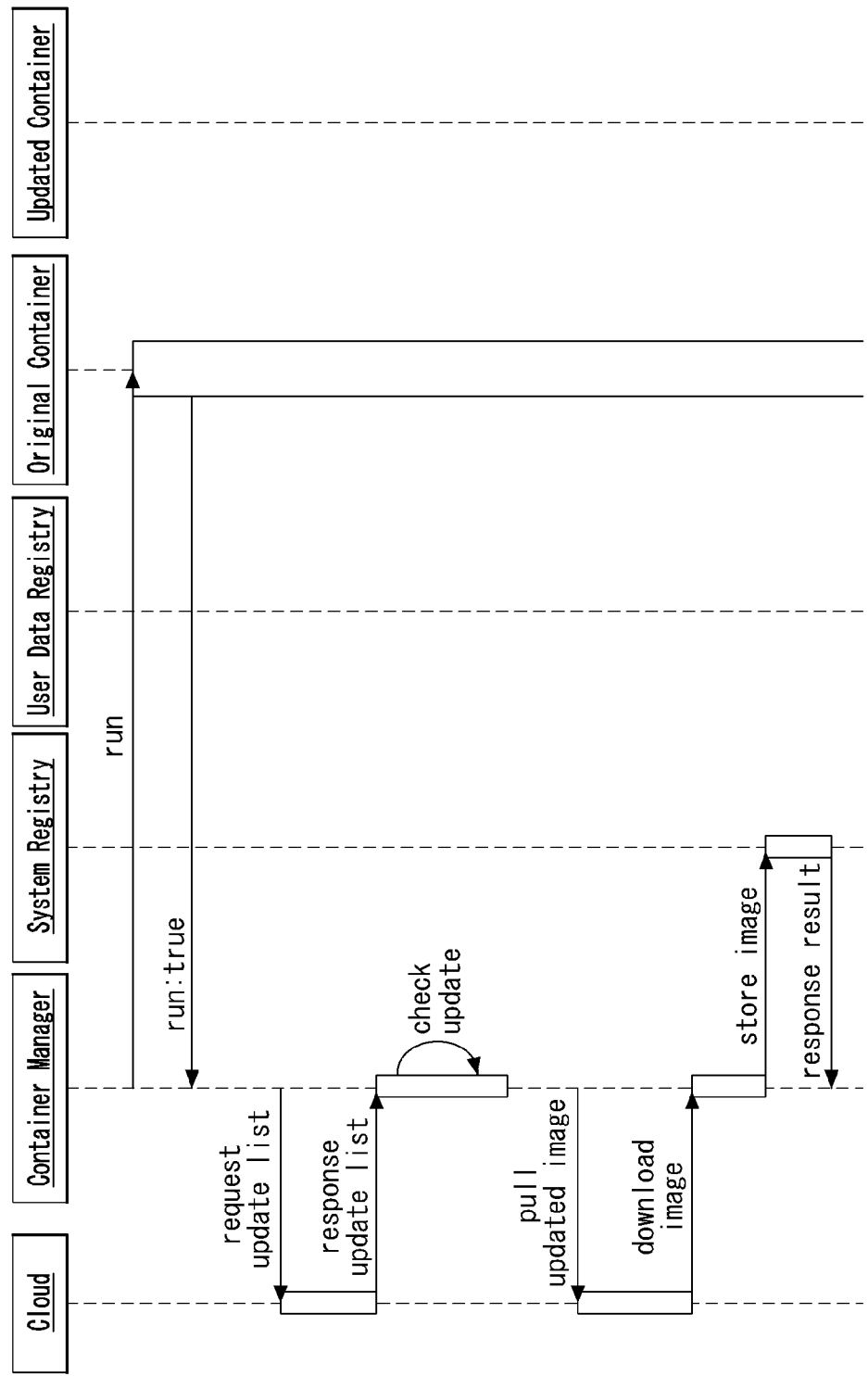

FIG. 9 is a view schematically illustrating a system configuration for implementing a method for updating a container in a container-based vehicle system according to an embodiment of the disclosure. FIGS. 10 and 11 are sequence diagrams illustrating an example of updating a container according to an embodiment of the disclosure.

Referring to FIGS. 9 to 11, a vehicle system 900 may include a container manager 910, an original container 920, an updated container 930, a system registry 940, and a user data registry 950. The vehicle system 900 may perform a container update via wireless communication with a server 960, the server 960 may comprise a cloud server, a network server and all other types of servers.

The container manager 910 manages the operation of the container that provides an independent environment including files and settings for driving applications executable in a vehicle environment. The original container 920 is a container previously installed in the vehicle and supporting the execution of the application. The updated container 930 may be a container that has been stored in the registry by downloading a new container image from the server when the vehicle determines to need to update the container.

Although FIGS. 9 to 11 illustrate that the original container 920 and the updated container 930 are logically separated from each other, the original container 920 may play a role as the updated container 930 after undergoing an update process.

The container manager 910 may instruct to execute the original container 920, and the original container 920 may transfer the result of execution to the container manager 910.

The container manager 910 may identify whether the original container 920 needs to be updated based on, e.g., conditions of a device mounted in the vehicle system or vehicle internal environment, application conditions necessary to execute the device, and software conditions for executing an application on the device. To that end, the container manager 910 may send a request for an update list to the server 960.

The server 960 transfers the update list to the container manager 910 in response to the request from the container manager 910. The server 960 includes a container registry 961, and the container registry 961 may include at least one container image. As the vehicle is driven in a cloud environment, the server 960 may, in real-time, reflect at least one piece of application information for controlling the vehicle system and update information needed for operating the vehicle system and store them in storage. Of the update information for the vehicle system, container-related update information may be located in the container registry 961.

The container manager 910 may identify whether the original container 920 needs to be updated by analyzing the update list received from the server 960. Upon determining that the original container 920 needs to be updated, the container manager 910 may send a request for an updated container image to the server 960 and download the same.

Meanwhile, the vehicle system 900 includes registries for storing container images. The registries may be divided into the system registry 940 and user data registry 950.

The system registry 940 stores container images. The container image is the original form of the container executed. Generally, the terms "container image" and "container" may be interchangeably used and, in the disclosure, the terms "container image" and "container" are used as having the same or similar concepts or meanings. The data included in the container image are data items initially set by developers. Accordingly, although the container is updated, the set data are maintained. However, the data included in the container may add more data or be changed according to the developers' intent. Meanwhile, the container may retain accumulated data. This may be data generated by use by users, unlike the initially set data inside the container image.

Thus, according to an embodiment of the disclosure, the user data registry 950 may be provided separately to store the data accumulated by use by users while the container is running. Further, container images may be located in the system registry 940. The system registry 940 is irrelevant to the data used by users. The same container image may be maintained in the system registry 940 regardless of whether the container is updated.

Thus, the container manager 910 may store the updated container image downloaded from the server in the system registry 940.

Referring to FIGS. 9 to 11, the container manager 910 may transfer a request for preparing to update to the original container 920. In response to the request to prepare to update, the original container 920 may generate user data in a commit form and store the user data in the user data registry 950 so that the user data accumulated while the original container 920 is executed may be seamlessly transferred to the updated container. In other words, upon determining that the original container 920 needs to be updated, the container manager 910 may allow the original container 920 to generate a user data commit and store the same in a separate space so that the user data may be continuously used even in the container which is to be updated, thereby completing the update preparation process.

The container manager 910 may receive the update preparation complete state of the original container 920. The container manager 910 allows the accumulated user data to be seamlessly used by associating the existing user data in the to-be-updated container by combining the user data with the to-be-updated container image. To that end, the container manager 910 combines the user data commit and the updated container invoked from the user data registry 950 and the system registry 940.

The container manager 910 may generate a new container by the combination. According to an embodiment of the disclosure, although the new container is generated, it is not in the container update terminated state. The container manager 910, after executing the new container, may terminate the container update by changing the nickname table.

The nickname table is a container management table in which container names are mapped to container positions. An embodiment of the disclosure delivers a seamless use experience to data users by managing the original container 920 and the updated container 930 via the container management table.

The container update process described above in connection with FIGS. 10 and 11 is described below in greater detail with reference to relevant drawings.

The container manager 910 included in the vehicle system 900 of FIG. 9 may perform the same function in the processor of the vehicle system 900. Although the original container 920 and the updated container 930 are distinguished from each other in FIG. 9, for ease of description, the original container 920 may simply be referred to as a container throughout the disclosure.

In the disclosure, the term "new container" may be interpreted as having the same meaning as the update target container image or update target container. If the container management table is varied with a new container generated, the state of the new container is defined as the updated container state.

Figure 12:
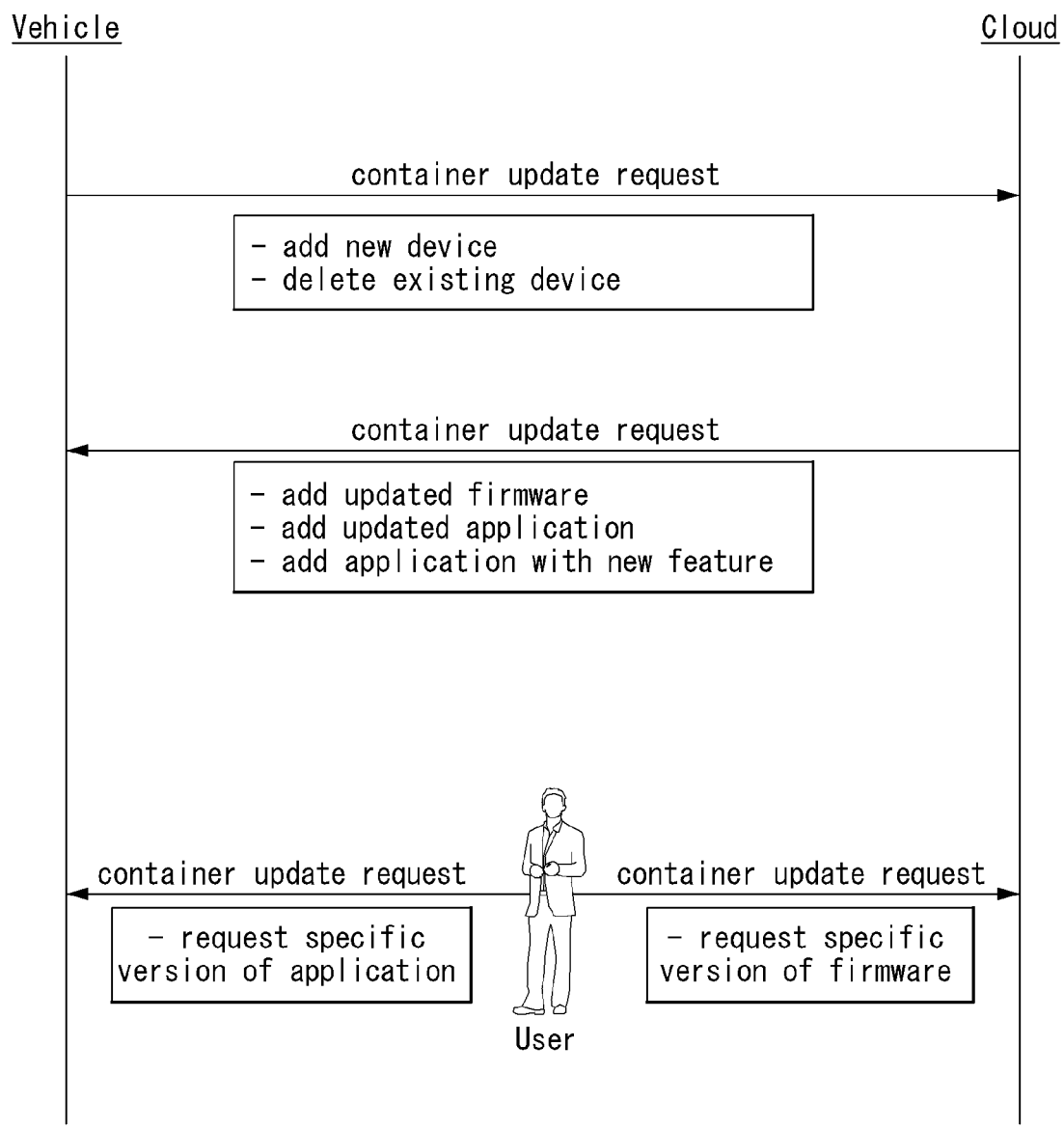
FIG. 12 is a view illustrating an example container update condition in a vehicle system according to an embodiment of the disclosure.

FIG. 12 is a view illustrating an example container update condition in a vehicle system according to an embodiment of the disclosure.

Referring to FIG. 12, when a new device is added to a vehicle or an existing device is removed from the vehicle, the vehicle system may send a request for a container update to the cloud.

Further, when the vehicle system is associated with a cloud environment and firmware updated for the device mounted in the vehicle is added, the cloud may transfer the firmware update state to the vehicle, and the vehicle system may send a request for a container update to the cloud. Where there is an updated application for an application executed on the device mounted in the vehicle, although an application with a new feature, which uses at least two or more devices mounted in the vehicle, is added, the cloud may transfer update information to the vehicle, and the vehicle system may send a request for a container update to the cloud.

By sensing the update condition in the vehicle system or the server, except for the case where a container update proceeds, the operation of sending a request for an update to the vehicle or cloud may be performed as the user manually requests to update a specific version of firmware or a specific version of application for the device mounted in the vehicle.

The update conditions are not limited to the above-described examples, but various update environments may be included.

Figure 13:
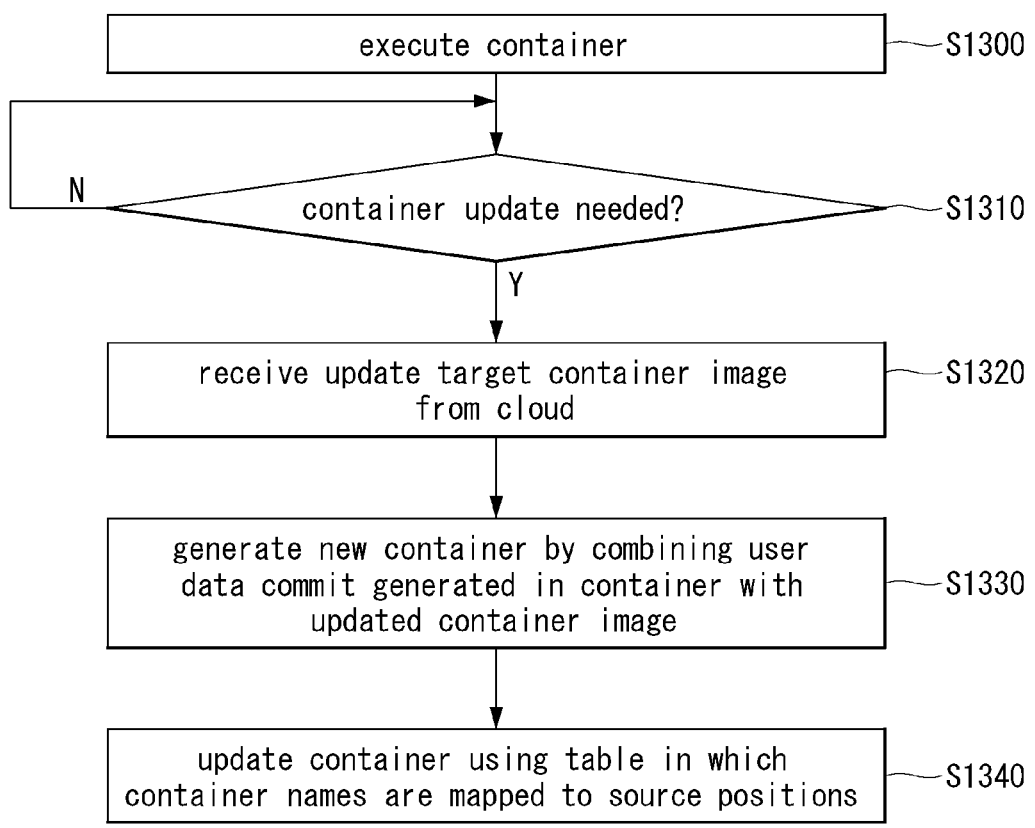
FIG. 13 is a flowchart illustrating a method for updating a container in a container-based vehicle system according to an embodiment of the disclosure.
Figure 14:
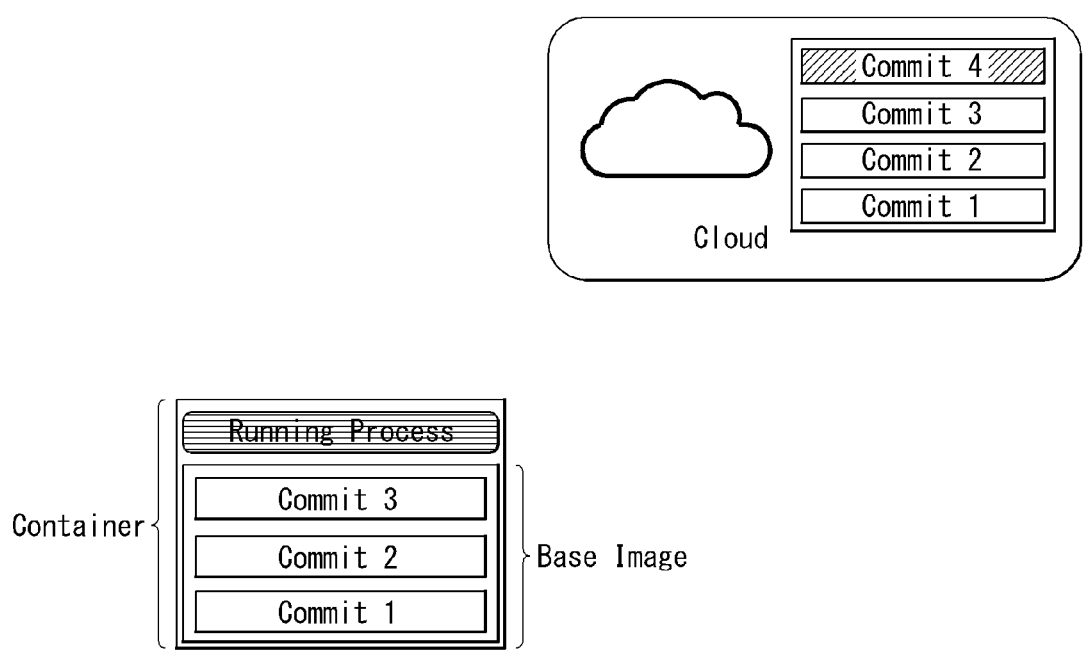
FIG. 14 is a view illustrating an example container image in each of a vehicle and a cloud.

FIG. 13 is a flowchart illustrating a method for updating a container in a container-based vehicle system according to an embodiment of the disclosure. FIG. 14 is a view illustrating an example container image in each of a vehicle and a cloud.

The method of FIG. 13 may be implemented by the processor of the vehicle system. As the processor controls a separately provided container manager (910 of FIG. 9), the method may be implemented. For ease of description, an example in which the processor performs the operations of the container manager 910 is described below.

Referring to FIG. 13, the processor may control to drive an application in an environment independent from the vehicle system environment by executing the container (S1300).

In FIG. 14, the container driven in the vehicle system may include at least one commit (commit 1, commit 2, and commit 3) and a running process.

The commit may mean the item added, deleted, and varied in the container. The commit does not store memory information dynamically generated. The commit may be stored in (or appended to) the container image and may be stored as a new image. The running process may mean an application executed by driving the container.

In the disclosure, it is assumed that, after the update condition is detected in the vehicle system, a container update operation is performed in association with the cloud. Thus, the server may include all of the at least one commit (commit 1, commit 2, and commit 3) included in the container of the vehicle system may be included in the server and may be in the state of a new commit 4 having been added.

The processor may monitor whether the container needs to be updated (S1310). As to whether the container needs to be updated, the container may be determined to need to be updated when the processor detects that a predetermined update condition is met, as described above in connection with FIG. 12.

Upon determining that the container needs to be updated (Y in S1310), the processor may receive the update target container image (commit 1, commit 2, commit 3, and commit 4) from the cloud (S1320).

The processor may generate a new container by combining the user data commit generated in the container and the updated container (S1330).

The user data commit may be stored in the user data registry, and the user data registry may be a storage area of the container image which stores changes to the user data. The updated container may be stored in the system registry, and the system registry may be a container image storage area that stores changes to system data.

The processor may perform a data association process to allow the new container to use the user data of the existing container. The data association process may be performed using the container management table.

The processor may update the container using the table in which container names are mapped to source positions (S1340).

Where two containers are independently executed in the context where the existing container and the new container containing updates coexist, the updates may be reflected in executing the application in the vehicle system. However, as the containers are executed in the environments independent from each other, if the new container is executed after the existing container is executed, the user data accumulated as the existing container is executed are not used in the new container. Since all devices are organically interlocked with each other in the vehicle system, data association-centered, table-type management may be needed to seamlessly reflect the updates in the existing container while the existing container is used. The container update using the above-described table is described below in greater detail with reference to FIGS. 22 to 24.

Figure 15:
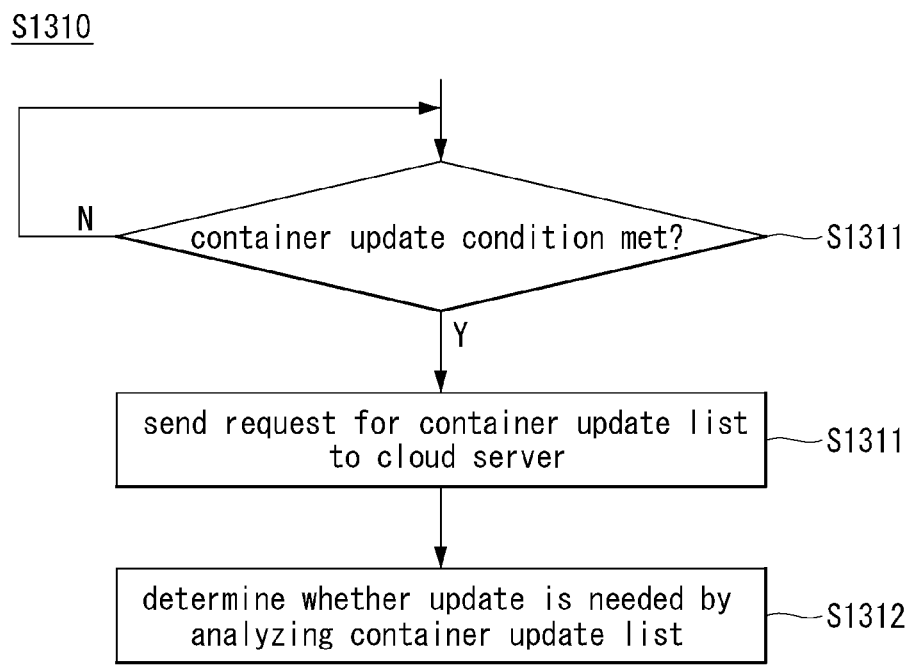
FIG. 15 is a flowchart illustrating, in detail, step S1310 of FIG. 13.

FIG. 15 is a flowchart illustrating, in detail, step S1310 of FIG. 13.

Referring to FIG. 15, the processor of the vehicle system may determine whether the container update condition is met (S1311).

For example, in the case where a first device is mounted in the vehicle, while a first container is driven so that a first application is executed, the processor may detect a mounting of a second device. Here, the second device is a device different from the first device, and a second container needed to drive a device may be an updated version performing similar functions to those of the first container. In this case, the processor may recognize that the first container needs to be updated to the second container.

The container update condition has been described above in detail with reference to FIG. 12.

Where the container update condition is met, the processor may send a request for a container update list to the server (S1311).

The processor may determine whether an update is needed by analyzing the container update list received from the cloud (S1312).

The container update list may include the commit information which is included in the existing container and, where there is a commit changed or added to the container update list received from the cloud, other than the commit information included in the existing container, the processor may determine that the container needs to be updated.

Upon determining that the container needs to be updated, the processor may associate the runtime data generated in the process of executing the existing container with the new container.

Figure 16:
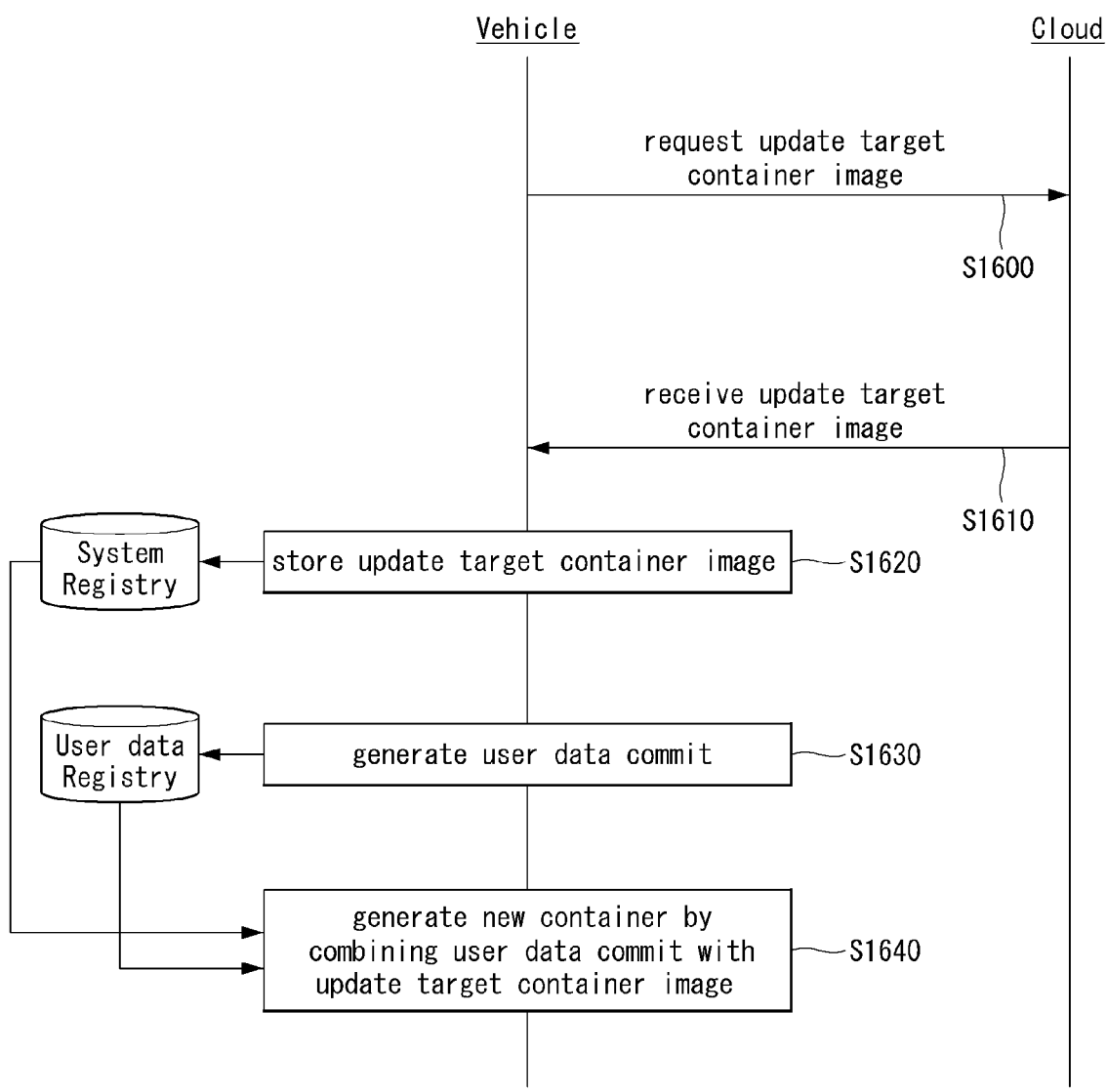
FIG. 16 is a flowchart illustrating an example operation of a legacy container to update a container according to an embodiment of the disclosure.

FIG. 16 is a flowchart illustrating an example operation of a legacy container to update a container according to an embodiment of the disclosure.

Referring to FIG. 16, the processor of the vehicle system may send a request for an update target container image to the server (S1600). The server may search for the update target container image requested by the vehicle in the container registry (961 of FIG. 9) over the cloud, in response to the request from the vehicle. The server may transmit the discovered update target container image to the vehicle (S1610).

The processor may store the update target container image received from the cloud in the system registry of the vehicle (S1620).

The processor may generate the data, which needs to be maintained for runtime replacement in the container which is in the state of being driven, as the user data commit (S1630). The user data commit may be stored in the user data registry. The system registry and the user data registry are divided from each other, and the data stored in the user data registry 950 may be data generated and/or changed while using the application and may include, e.g., the user's personal information or purchase history.

The processor may generate a new container by combining the user data commit stored in the user data registry with the update target container image stored in the system registry (S1640).

Figure 17:
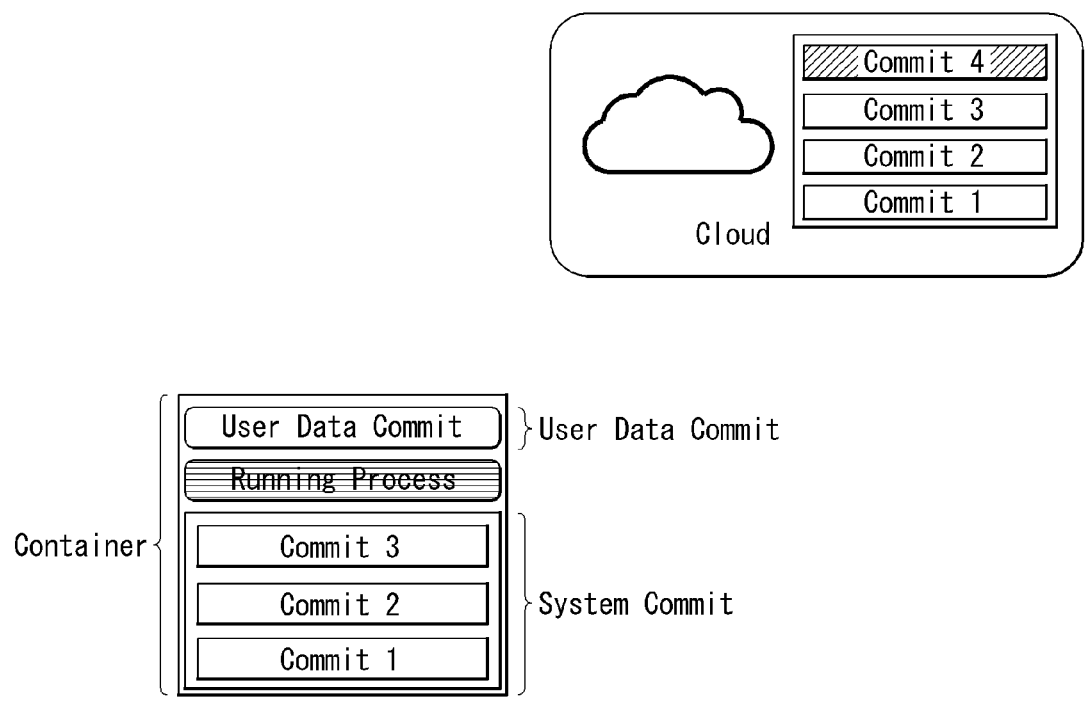
FIGS. 17, 18, and 19 are views illustrating a process of generating a new container as illustrated in FIG. 16.
Figure 18:
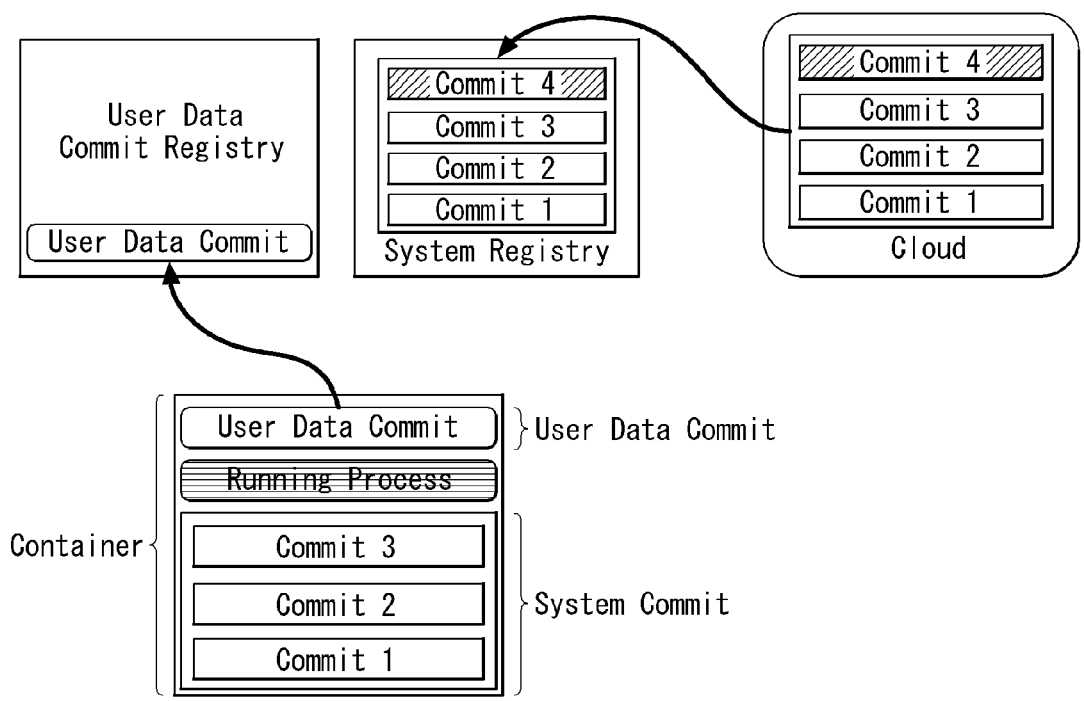
Figure 19:
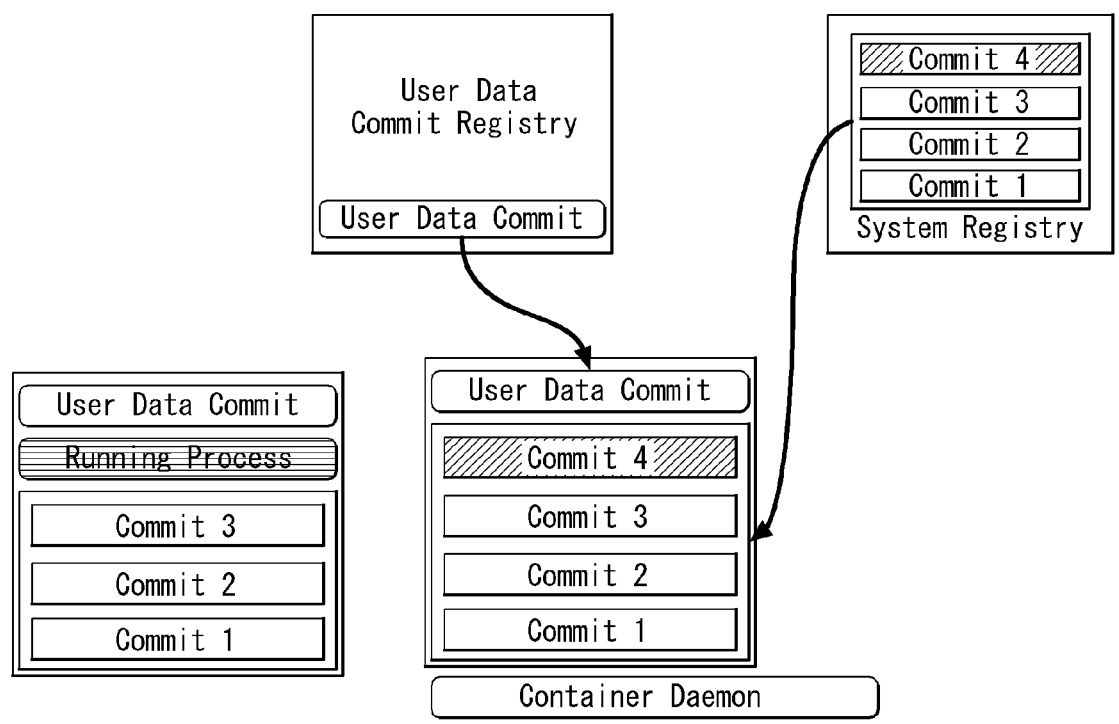

FIGS. 17, 18, and 19 are views illustrating a process of generating a new container as illustrated in FIG. 16.

Referring to FIG. 17, the existing container which is being driven may generate user data with a commit upon receiving an update request at the runtime timing. Accordingly, the existing container may be divided into the system commit and the user data commit.

Referring to FIG. 18, the user data commit generated in the existing container may be stored in the user data registry. The update target container image (commit 1, commit 2, commit 3, and commit 4) may be downloaded from the cloud and be stored in the system registry of the vehicle.

Referring to FIG. 19, the processor may generate a new container image by combining the user data commit included in the user data registry and the system commit stored in the system registry. The new container shown in FIG. 19 includes the user data commit generated in the existing container, as it is. The user data commit may be in the form of a file, directory, or text.

The process of preparing for a new container image to update the existing container has been described above. A process for updating the existing container to a new container is described below.

Figure 20:
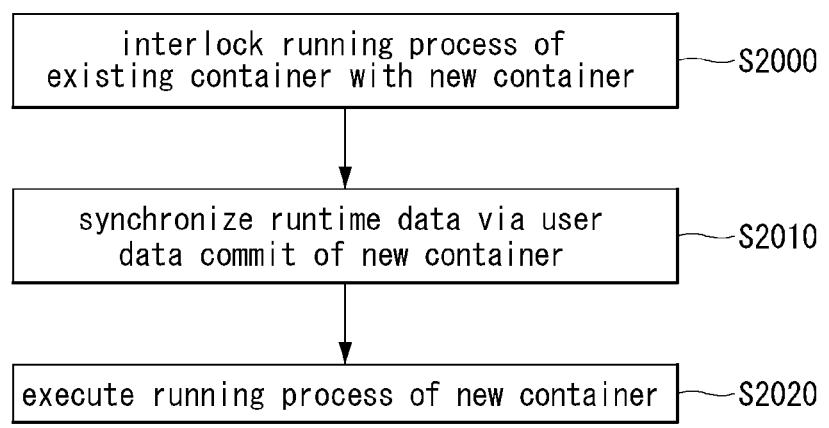
FIG. 20 is a flowchart illustrating another process of updating a container according to an embodiment of the disclosure.
Figure 21:
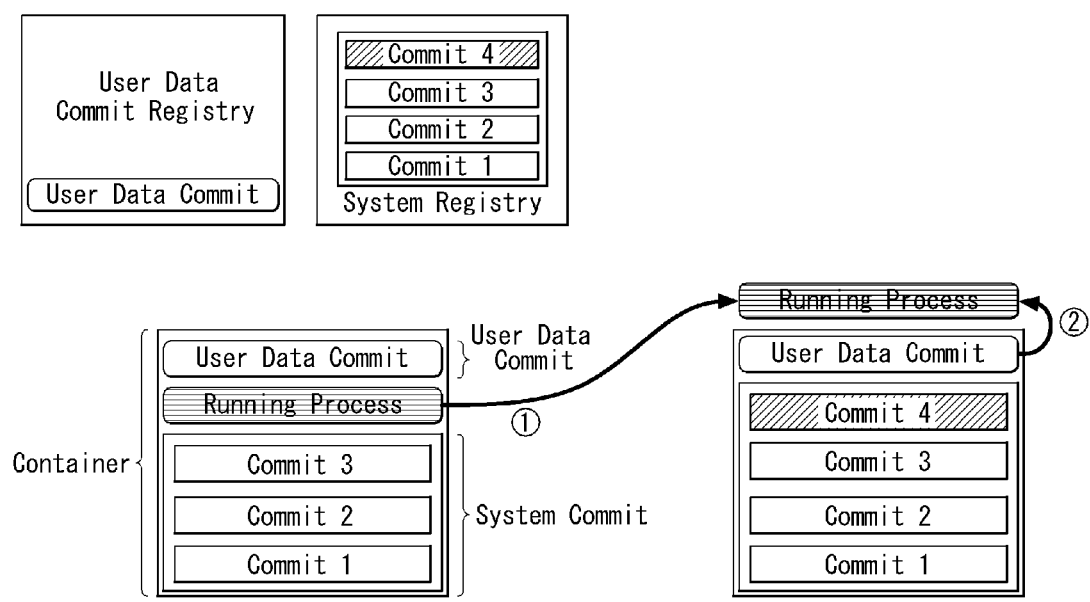
FIG. 21 is a view illustrating an embodiment as illustrated in FIG. 20.

FIG. 20 is a flowchart illustrating another process of updating a container according to an embodiment of the disclosure. FIG. 21 is a view illustrating an embodiment as illustrated in FIG. 20.

Referring to FIG. 20, the processor may interlock the running process of the existing container with the new container (S2000). The running process may mean an application that has been executed by driving the existing container.

The processor may perform runtime synchronization via the user data commit of the new container (S2010). The processor may execute the running process of the new container (S2020).

For example, upon determining that the container needs to be updated via the user's input while using an application by driving the existing container, the processor is needed to synchronize the user data, which has been generated by use of the application up to a time before the user's input, with the time when the same application is executed to drive the new container so that the user may seamlessly use the application.

From a point of view of a seamless switching of user data, it may be perceived by the user as if the new container uses the existing container as it is. However, according to an embodiment of the disclosure, a switching to the new container occurs immediately when runtime data synchronization is complete via the user data commit in the state where a copy of the existing container and additional system commits all have been reflected in the system background. The container manager may control a switching from the existing container to the new container to drive the application.

Referring to FIG. 21, the new container image allows the running process of the existing container to be executed via a driving of the new container. During this course, data synchronization may be performed using the user data commit included in the new container.

Meanwhile, the nickname table may be used for a seamless container switching. If the user data commit of the existing container is stably transferred to the new container, and interlocking from the new container to the running process is complete, the data which used to be received in the existing container may be transferred to the new container via a change in the nickname table. Here, the nickname table may be referred to as a container management table.

Figure 22:
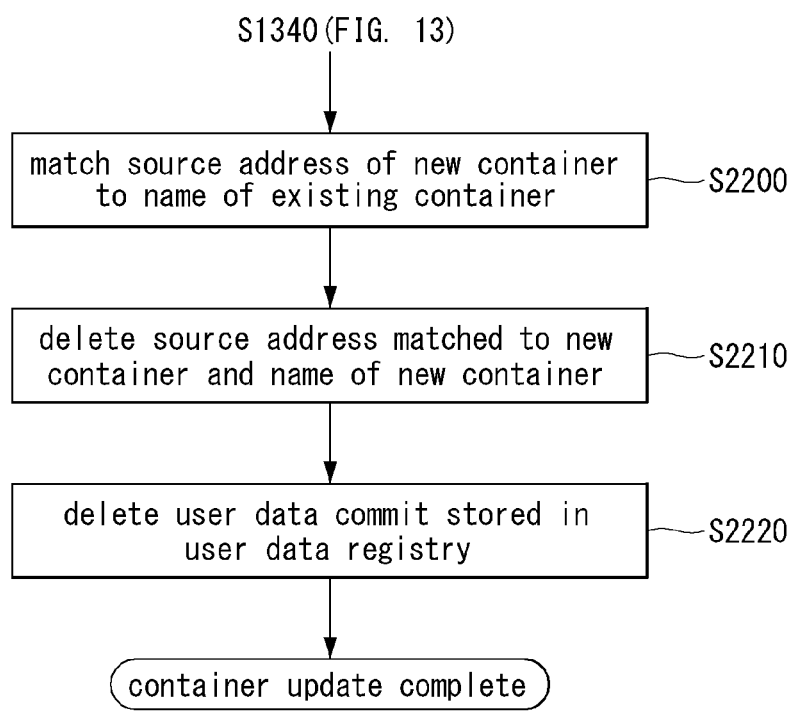
FIG. 22 is a flowchart illustrating a data-centered container update process according to an embodiment of the disclosure.
Figure 23:
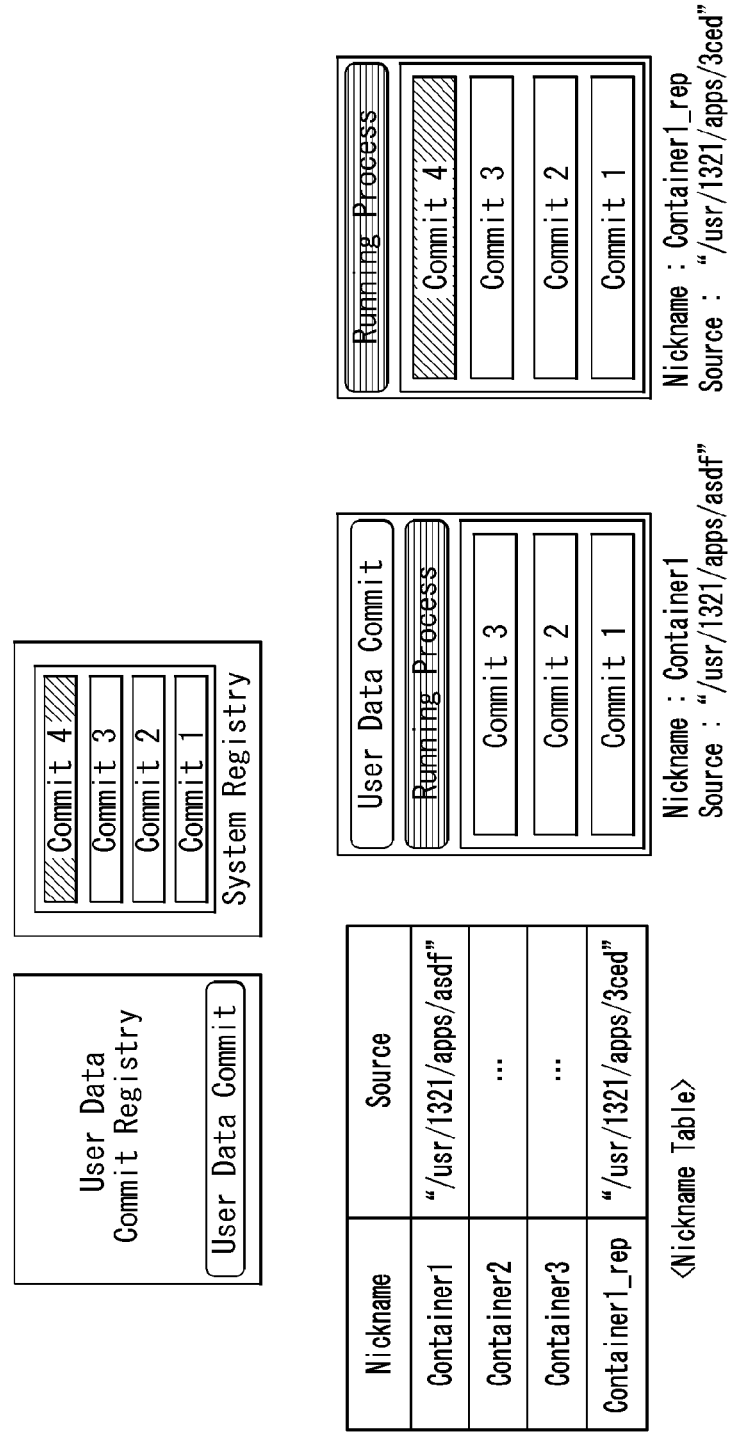
FIGS. 23, 24, 25, and 26 are views illustrating an embodiment as illustrated in FIG. 22.
Figure 24:
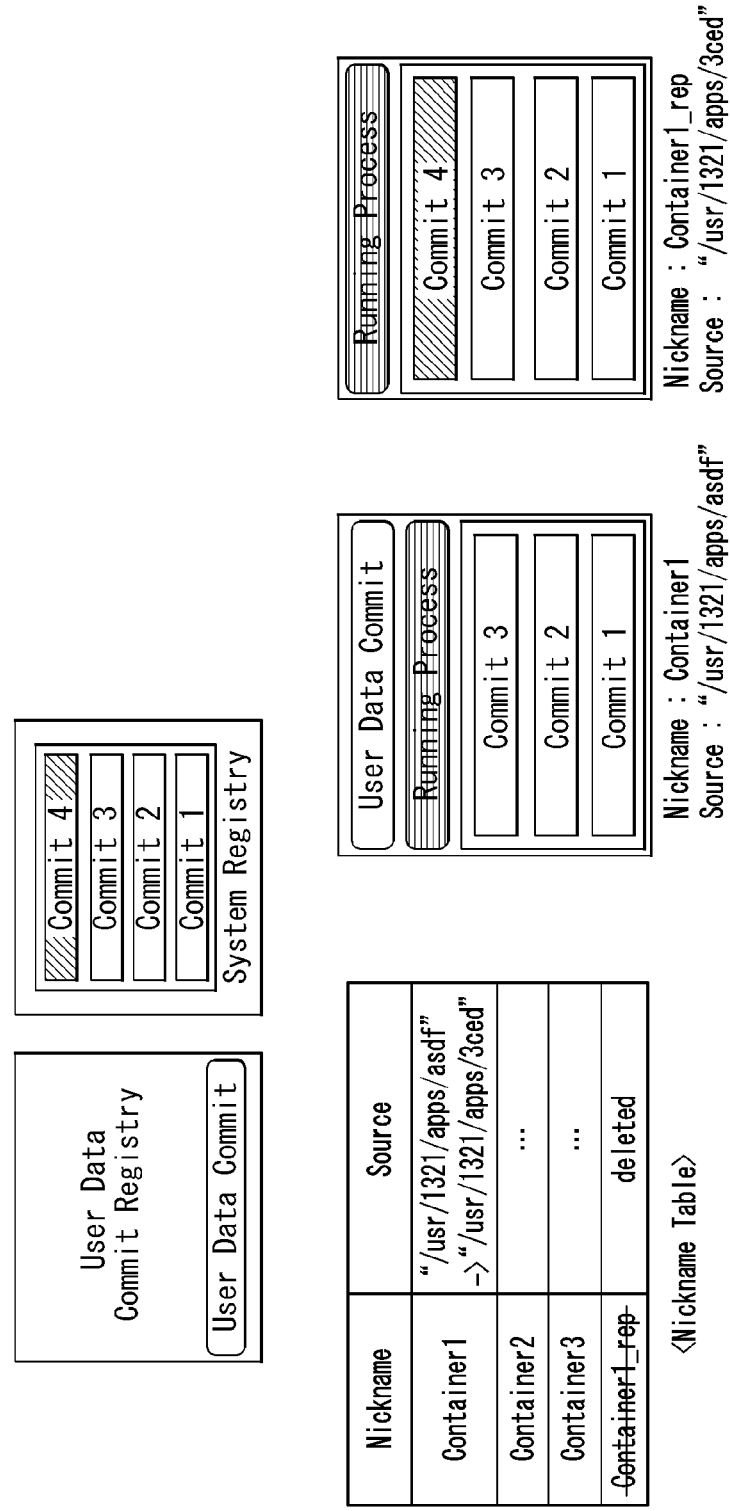
Figure 25:
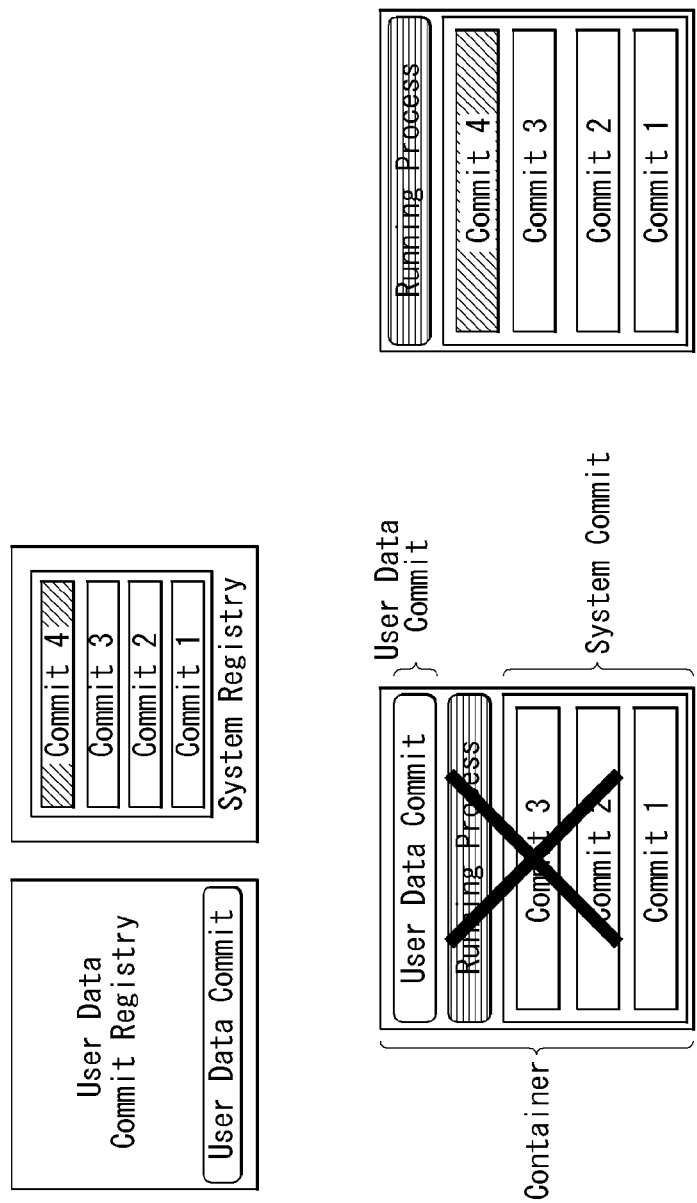
Figure 26:
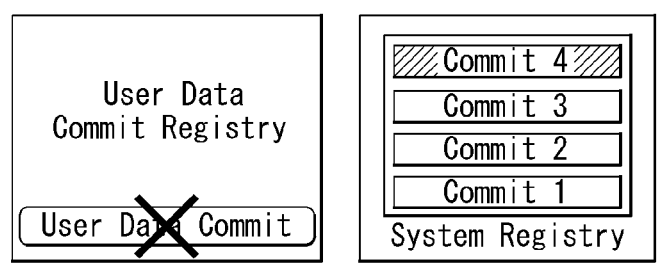
Figure 26:
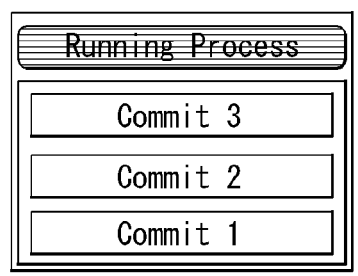

FIG. 22 is a flowchart illustrating a data-centered container update process according to an embodiment of the disclosure. FIGS. 23, 24, 25, and 26 are views illustrating an embodiment as illustrated in FIG. 22.

Referring to FIG. 22, the processor may update the container using the table in which container names are mapped to source positions (S1340 of FIG. 13).

The container management table may be a table in which at least one container name (Container 1, Container 2, and Container 3) is mapped to the source address of each container. When receiving the update target container image from the cloud and storing the same in the system registry, the processor may match the name (e.g., Container 1_rep) of the update target container and the source address of the corresponding container and add the same to the container management table (refer to FIG. 23).

When the interlocking of the running process is complete, the processor may update the container management table to allow the source address of the new container to be matched to the name of the container (S2200).

The processor may delete the name of the new container and the source address matched to the name of the new container (S2210).

The container management table may delete the name (e.g., Container 1_rep) of the update target container, and the source address corresponding thereto may be mapped to the existing container (Container 1). Thus, the source address of the existing container may be changed (refer to FIG. 24).

The processor may delete the container before the container is updated. The processor may stop the driving of the existing container and delete the system commit included in the container (refer to FIG. 25).

The processor may delete the user data commit stored in the user data registry (S2220).

The processor may delete the user data commit stored in the user data registry, thereby completing the operation of updating the existing container.

The above-described embodiments of the disclosure may be implemented in code that a computer may read out of a recording medium. The computer-readable recording medium includes all types of recording devices storing data readable by a computer system. Examples of the computer-readable recording medium include hard disk drives (HDDs), solid state disks (SSDs), silicon disk drives (SDDs), read-only memories (ROMs), random access memories (RAMs), CD-ROMs, magnetic tapes, floppy disks, or optical data storage devices, or carrier wave-type implementations (e.g., transmissions over the Internet). Thus, the above description should be interpreted not as limiting in all aspects but as exemplary. The scope of the disclosure should be determined by reasonable interpretations of the appended claims and all equivalents of the disclosure belong to the scope of the disclosure.

What is claimed is:

1. A method for updating a container in a container-based vehicle system, comprising:
   executing an application included in the container, the application configured to access at least one item included in the container to operate a service related to a vehicle;
   receiving, from a cloud server, a container image of an update target based on determining an update of the container being needed, the container image including a set of items;
   storing the received container image of the update target in a system registry;
   generating a new container by combining a user data item that is generated in the container and the stored container image of the update target; and
   updating the container by using a container management table on the new container, the container management table configured to map a container name to a source location,
   wherein updating the container is performed while executing the application, and
   wherein the application reflects the updated container based on items included in the updated container.

2. The method of claim 1, wherein
   the user data item is required to be maintained while the application is executed.

3. The method of claim 1, wherein
   the user data item is generated in a form of at least one of a file, a directory, or text.

4. The method of claim 1, wherein
   the user data item is stored in a user data registry.

5. The method of claim 1, wherein
   the update of container is determined, based on recognizing at least one of an addition of a new device to the vehicle, a removal of an existing device from the vehicle, a detection of a request for a specific version of application or a specific version of firmware for a device mounted in the vehicle, an addition of an updated application or updated firmware for the device mounted in the vehicle and associated with a cloud environment, or an addition of an application with a new function using at least two or more devices associated with the cloud environment, to be needed.

6. The method of claim 1, further comprising:
   detecting a predetermined event satisfying a container update condition while executing the application;
   sending, to the cloud server, a request for a container update list based on the detection; and
   determining whether the container needs to be updated by analyzing the container update list received from the cloud server in response to the request.

7. The method of claim 6, further comprising:
   transmitting, to the cloud server, a type of item used by the container based on determining a replacement of the container being needed for the update;
   receiving, from the cloud server, a replaceable second container; and controlling to switch an approach path of vehicle data from the container to the second container.

8. The method of claim 7, further comprising:
generating, by the container, the user data item in response to a request for data used by the container from the second container.

9. The method of claim 1, further comprising:
requesting the container to prepare for an update;
generating the user data item via the container; and
storing the generated user data item in a user data registry.

10. The method of claim 1, further comprising:
interlocking the executed application for controlling the execution of the container and the new container;
synchronizing runtime data associated with the executed application via the user data item included in the new container; and
executing the application from the new container.

11. The method of claim 10, further comprising:
updating, based on the interlocking of the executed application being complete, the container management table to match a source address of the new container to a name of the container.

12. The method of claim 11, wherein
updating the container management table includes:
deleting a name of the new container and a source address matched to a name of the new container.

13. The method of claim 11, further comprising:
deleting the container before the container is updated; and
deleting the user data item stored in a user data registry.

14. A vehicle system, comprising:
a processor functionally connected to a container storage unit, a system registry, and a user data registry,
wherein the container storage unit is configured to store (i) a container including data and a system library and (ii) at least one program for controlling an execution of an application executable in a vehicle, the system registry is configured to store a system container image, and the user data registry is configured to store user data generated while executing the container,
wherein the processor is configured to control an update of the container by performing operations comprising:
executing the application included in the stored container, the application configured to access at least one item included in the container to operate a service related to the vehicle,
receiving, from a cloud server, a container image of an update target based on determining an update of the container being needed,
storing the received container image of the update target in the system registry;
generating a new container by combining a user data item that is generated in the container and the stored container image of the update target; and
updating the container by using a container management table on the new container, the container management table configured to map a container name to a source location,
wherein updating the container is performed while executing the application, and
wherein the application reflects the updated container based on items included in the updated container.

15. The vehicle system of claim 14, wherein
the user data item is required to be maintained while executing the application.

16. The vehicle system of claim 14, wherein
the user data item is generated in a form of at least one of a file, a directory, or text.

17. The vehicle system of claim 14, wherein
the operations further include:
detecting a predetermined event satisfying a container update condition while executing the application;
sending, to the cloud server, a request for a container update list based on the detection; and
determining whether the container needs to be updated by analyzing the container update list received from the cloud server.

18. The vehicle system of claim 14, wherein
the operations further include:
requesting the container to prepare for an update;
generating the user data item via the container; and
storing the generated user data item in the user data registry.

19. The vehicle system of claim 14, wherein
the operations further include:
interlocking the executed application for controlling the execution of the container and the new container; and
synchronizing runtime data associated with the executed application via the user data item included in the new container; and
executing the application from the new container.

20. The vehicle system of claim 19, wherein the operations further include:
updating, based on the interlocking of the application being complete, the container management table to match a source address of the new container to a name of the container.

* * * * *